(12) United States Patent
Ko et al.

(10) Patent No.: US 11,388,717 B2
(45) Date of Patent: Jul. 12, 2022

(54) METHOD AND DEVICE FOR TRANSMITTING INFORMATION RELATED TO SL SLOT IN NR V2X

(71) Applicant: LG Electronics Inc., Seoul (KR)

(72) Inventors: Woosuk Ko, Seoul (KR); Daesung Hwang, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/538,382

(22) Filed: Nov. 30, 2021

(65) Prior Publication Data

US 2022/0086836 A1    Mar. 17, 2022

Related U.S. Application Data

(63) Continuation of application No. PCT/KR2021/001539, filed on Feb. 5, 2021.

(60) Provisional application No. 62/976,338, filed on Feb. 13, 2020, provisional application No. 62/975,697, filed on Feb. 12, 2020.

(30) Foreign Application Priority Data

Mar. 19, 2020 (KR) .......... 10-2020-0034013

(51) Int. Cl.
*H04J 3/00* (2006.01)
*H04W 72/04* (2009.01)
*H04L 5/14* (2006.01)

(52) U.S. Cl.
CPC .......... *H04W 72/0446* (2013.01); *H04L 5/14* (2013.01)

(58) Field of Classification Search
CPC .................... H04W 72/0446; H04L 5/14
USPC ....................................... 370/280
See application file for complete search history.

(56) References Cited

U.S. PATENT DOCUMENTS

| 2020/0015214 A1* | 1/2020 | Si ............ H04W 72/044 |
| 2020/0037306 A1 | 1/2020 | Seo |
| 2021/0037513 A1* | 2/2021 | Wu ............ H04W 72/044 |
| 2021/0099988 A1* | 4/2021 | Wu ............ H04L 5/0091 |

OTHER PUBLICATIONS

VIVO, "Sidelink Synchronization Mechanism", R1-1911421, Oct. 14-20, 2019. (From Applicant's IDS) (Year: 2019).*
VIVO, "Sidelink Synchronization Mechanism", R1-1912024, Oct. 19-22, 2019. (From Applicant's IDS) (Year: 2019).*

(Continued)

*Primary Examiner* — Mang Hang Yeung
(74) *Attorney, Agent, or Firm* — Fish & Richardson P.C.

(57) ABSTRACT

Proposed is an operation method of a first device in a wireless communication system. The method may comprise the steps of: receiving, from a base station, TDD-UL-DL configuration information including information related to a first slot pattern and information related to a second slot pattern; acquiring the number of first SL slots related to the first slot pattern and the number of second SL slots related to the second slot pattern on the basis of first SCS related to SL communication and the TDD-UL-DL configuration information; and transmitting, to a second device, a PSBCH including information related to the number of the first SL slots and information related to the number of the second SL slots.

15 Claims, 22 Drawing Sheets

(56) References Cited

OTHER PUBLICATIONS

3GPP, "3rd Generation Partnership Project; Technical Specification Group Radio Access Network; NR; Physical layer procedures for control (Release 16)," TS 38.213 V16.0.0, Dec. 2019, 11 pages.
Huawei & HiSilicon, "Sidelink synchronization mechanisms for NR V2X," R1-1911885, Presented at 3GPP TSG RAN WG1 Meeting #99, Reno, USA, Nov. 18-22, 2019, 24 pages.
LG Electronics, "Discussion on NR sidelink synchronization mechanism," R1-1912590, Presented at 3GPP TSG RAN WG1 #99 Meeting, Reno, US, Nov. 18-22, 2019, 9 pages.
Vivo, "Sidelink synchronization mechanism," R1-1911421, Presented at 3GPP TSG RAN WG1 Meeting #98bis, Chongqing, China, Oct. 14-20, 2019, 19 pages.
Vivo, "Sidelink synchronization mechanism," R1-1912024, Presented at 3GPP TSG RAN WG1 Meeting #99, Reno, USA, Nov. 18-22, 2019, 19 pages.

* cited by examiner

FIG. 4
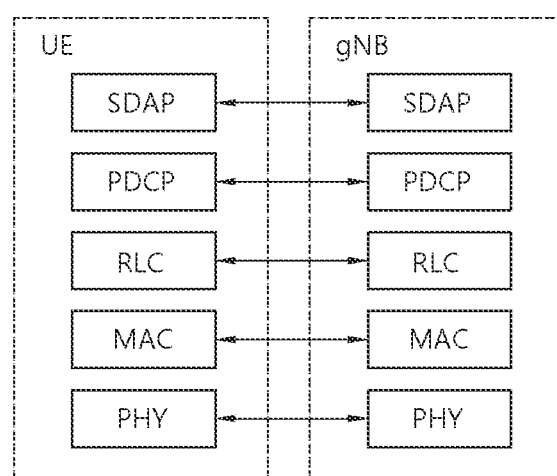
(a)
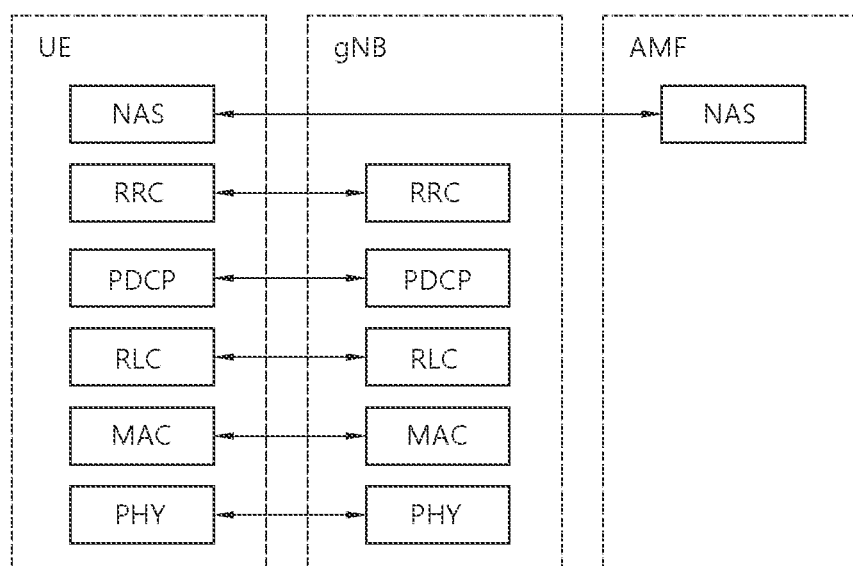
(b)

FIG. 8
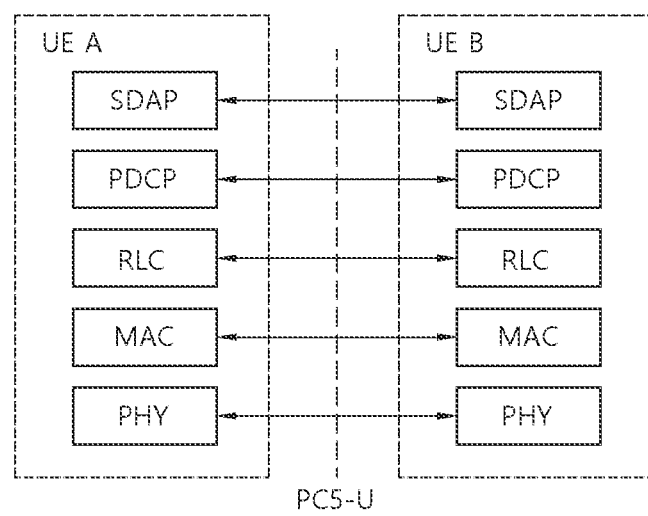
(a)
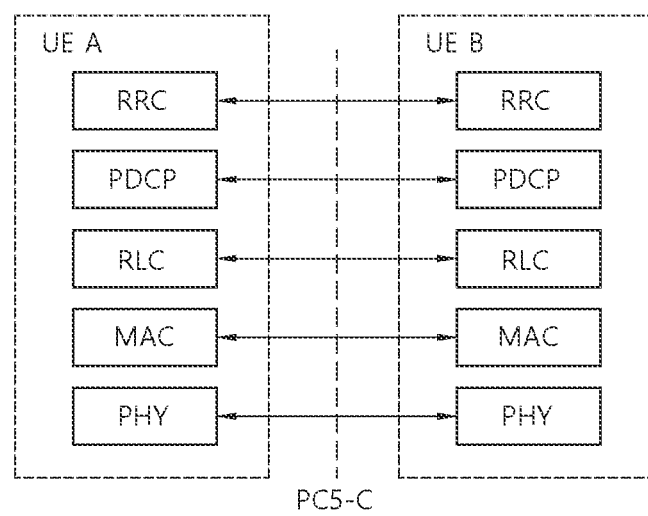
(b)

METHOD AND DEVICE FOR TRANSMITTING INFORMATION RELATED TO SL SLOT IN NR V2X

CROSS-REFERENCE TO RELATED APPLICATIONS

Pursuant to 35 U.S.C. § 119(e), this application is a continuation of International Application PCT/KR2021/001539, with an international filing date of Feb. 5, 2021, which claims the benefit of U.S. Provisional Patent Application No. 62/975,697, filed on Feb. 12, 2020, U.S. Provisional Patent Application No. 62/976,338, filed on Feb. 13, 2020, and Korean Patent Application No. 10-2020-0034013, filed in the Korean Intellectual Property Office on Mar. 19, 2020, the contents of which are hereby incorporated by reference herein in its entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM(Basic Safety Message), CAM(Cooperative Awareness Message), and DENM(Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first apparatus 100 in a wireless communication system is proposed. The method may include: receiving time division duplex-uplink-downlink (TDD-UL-DL) configuration information including information related to a first slot pattern and information related to a second slot pattern from a base station 300, obtaining the number of first sidelink (SL) slots related to the first slot pattern and the number of second SL slots related to the second slot pattern, based on a first subcarrier spacing (SCS) related to SL communication and the TDD-UL-DL configuration information; and transmitting a physical sidelink broadcast channel (PSBCH) including information related to the number of the first SL slots and information related to the number of the second SL slots to a second apparatus 200.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
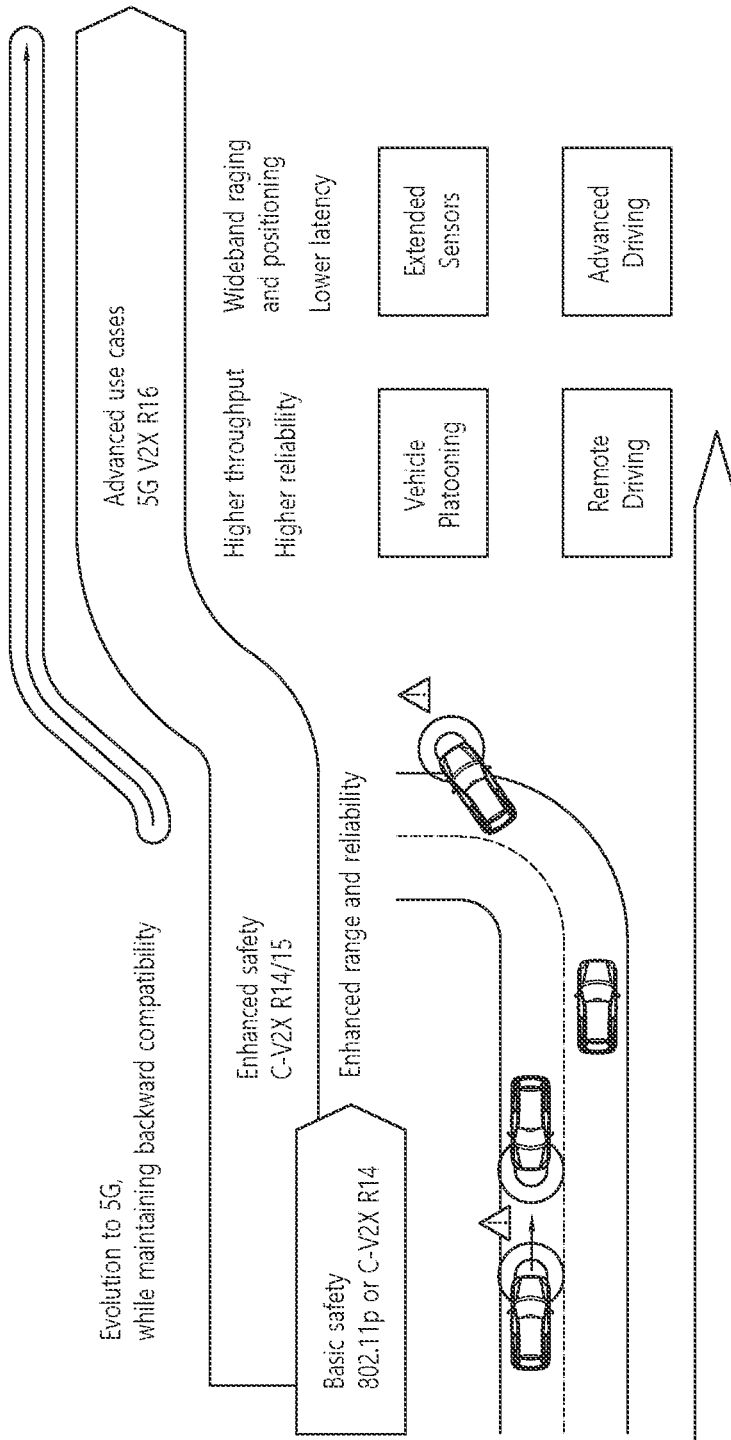
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
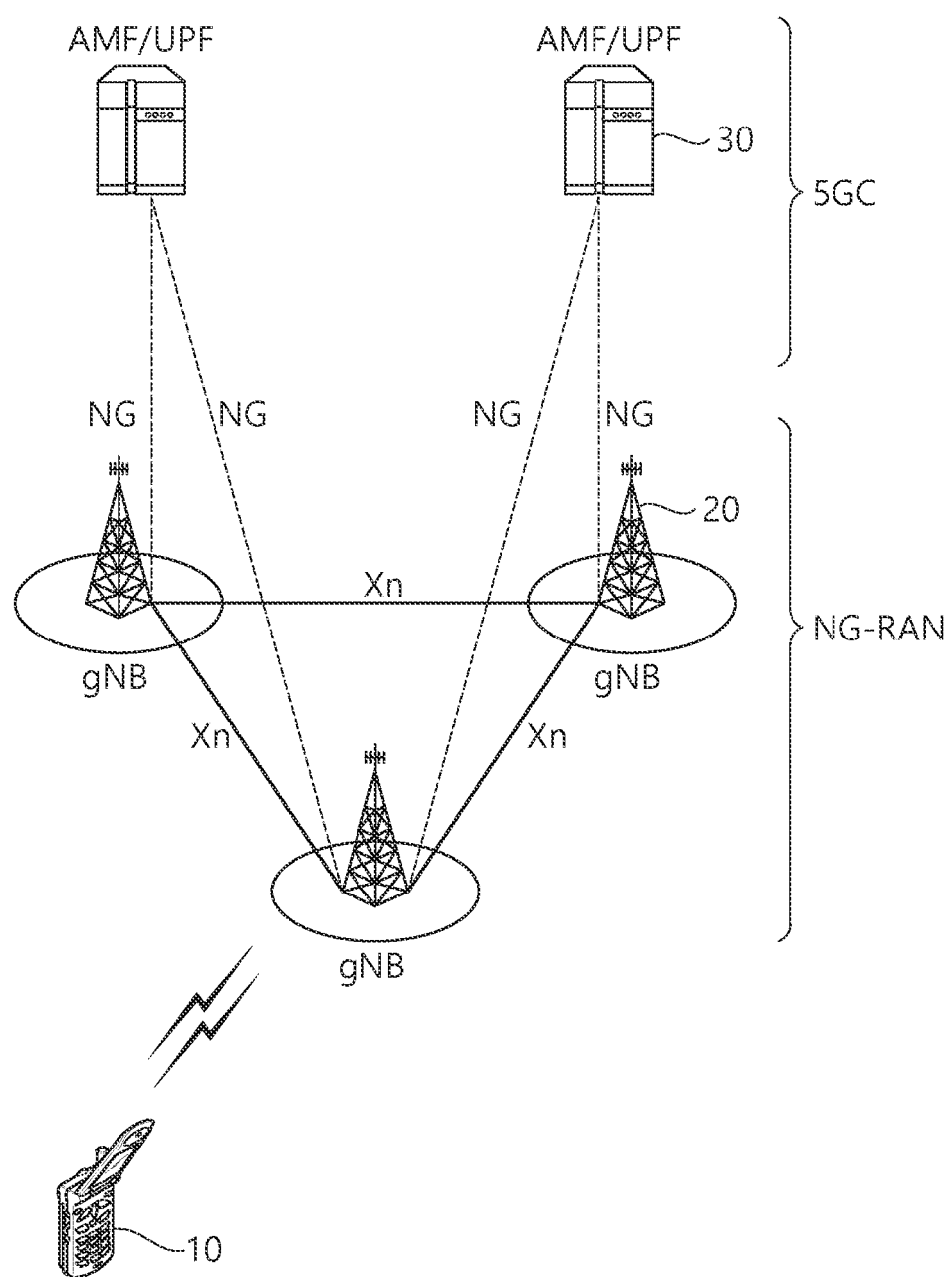
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
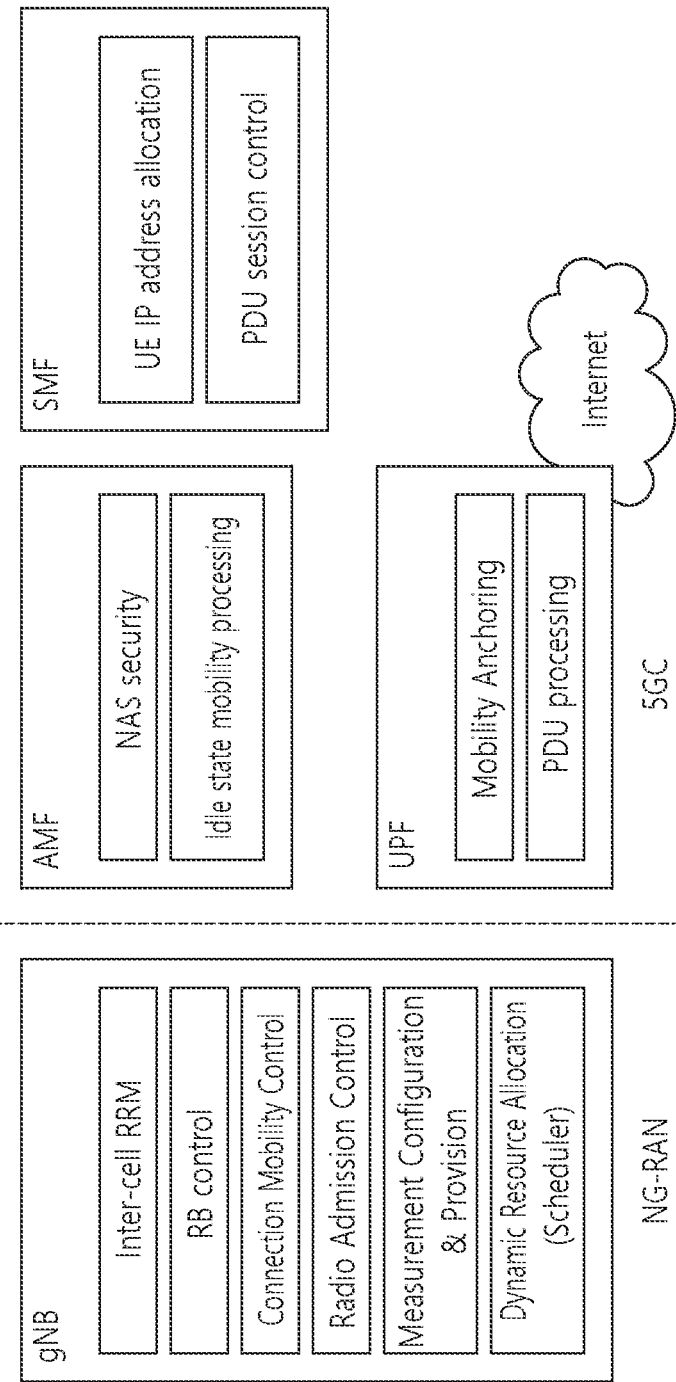
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
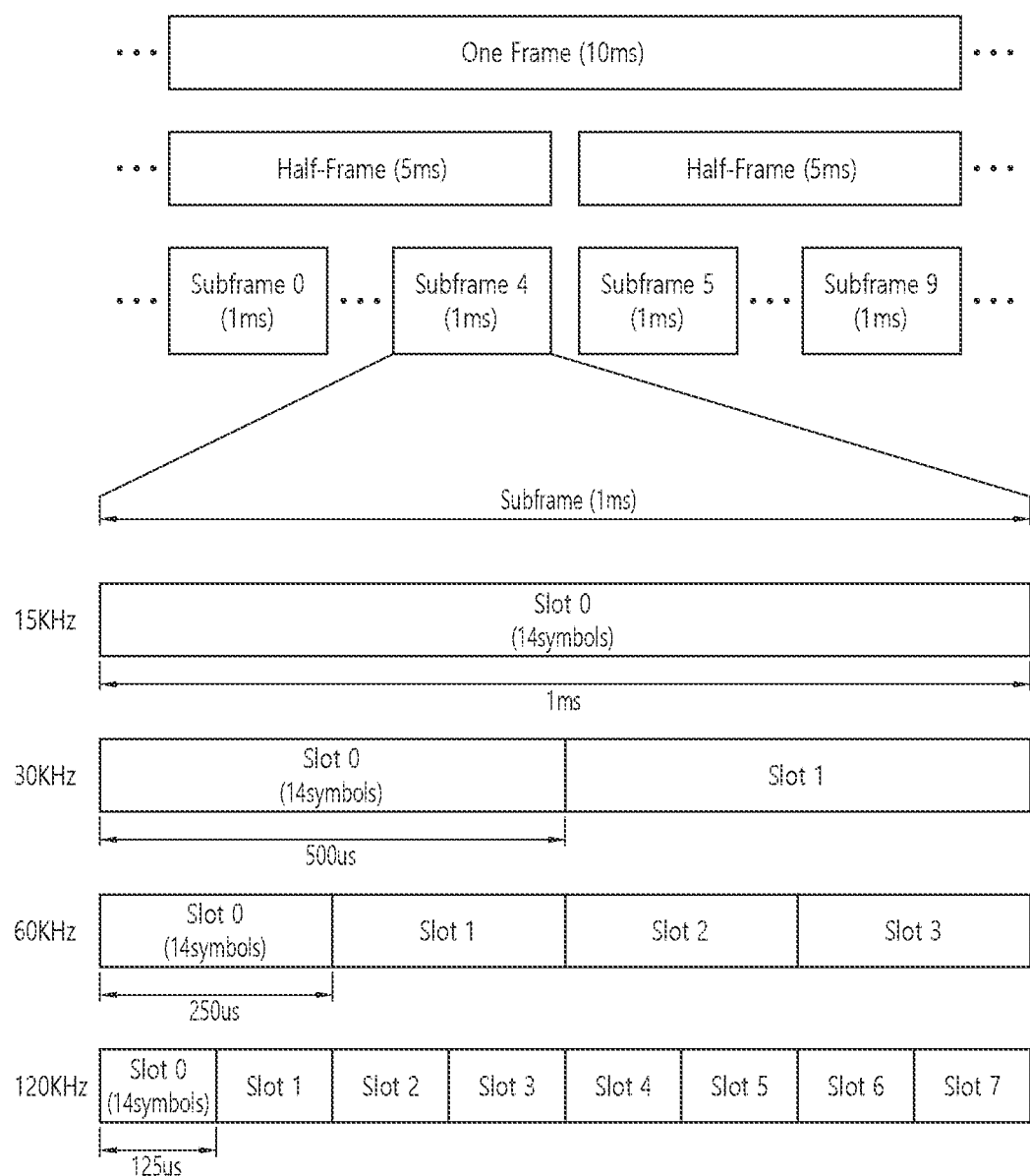
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
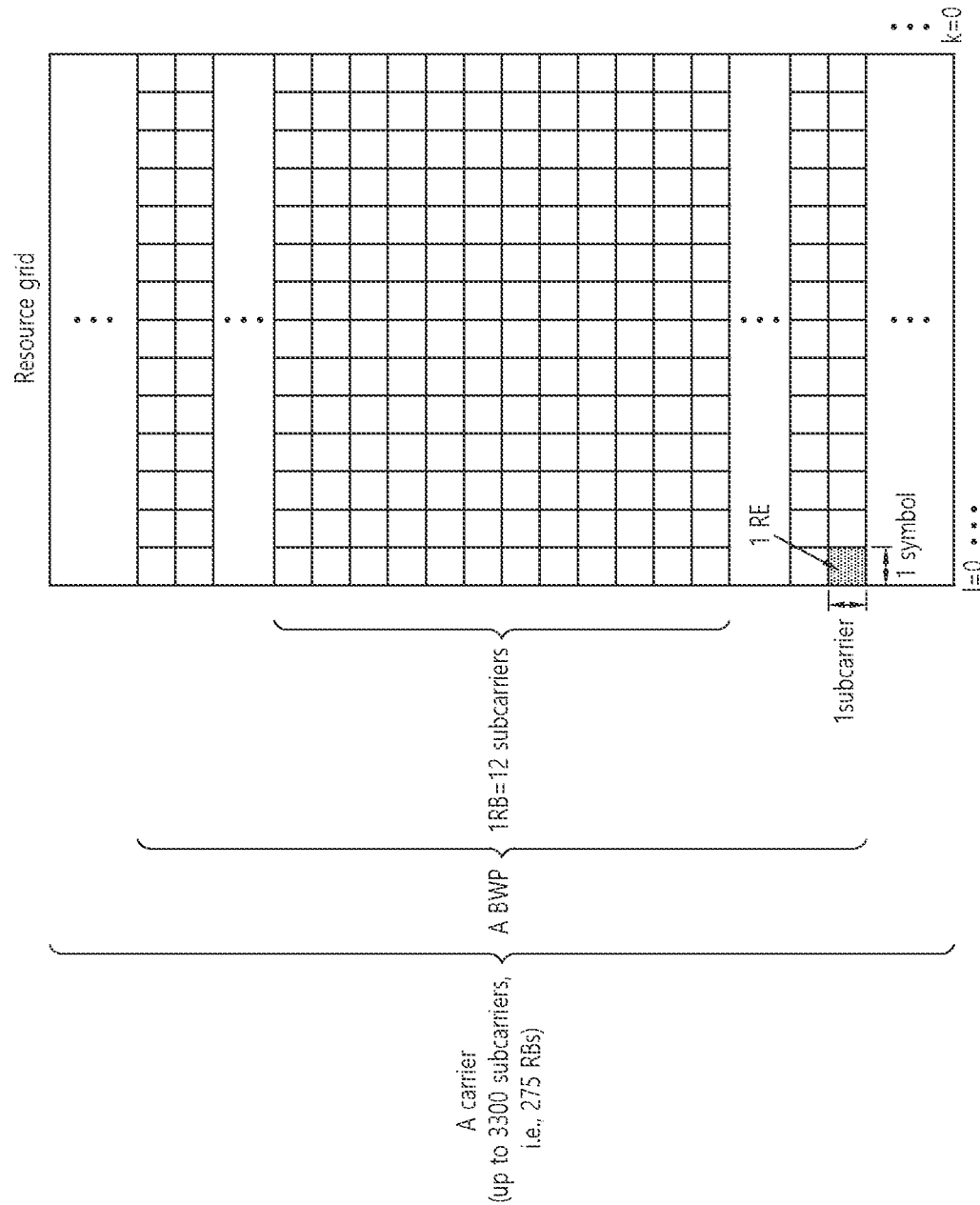
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET. For example, the RMSI CORESET may be configured by physical broadcast channel (PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
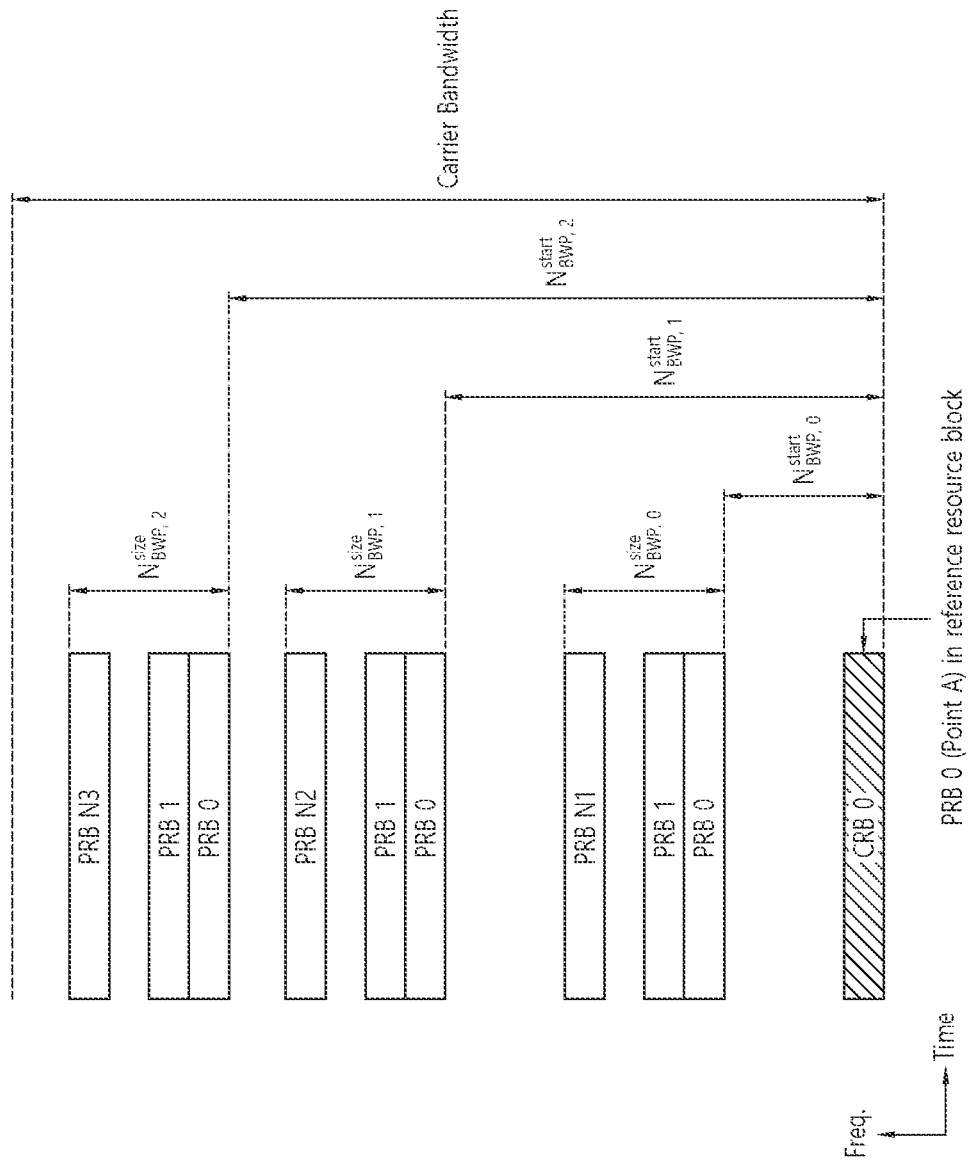
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
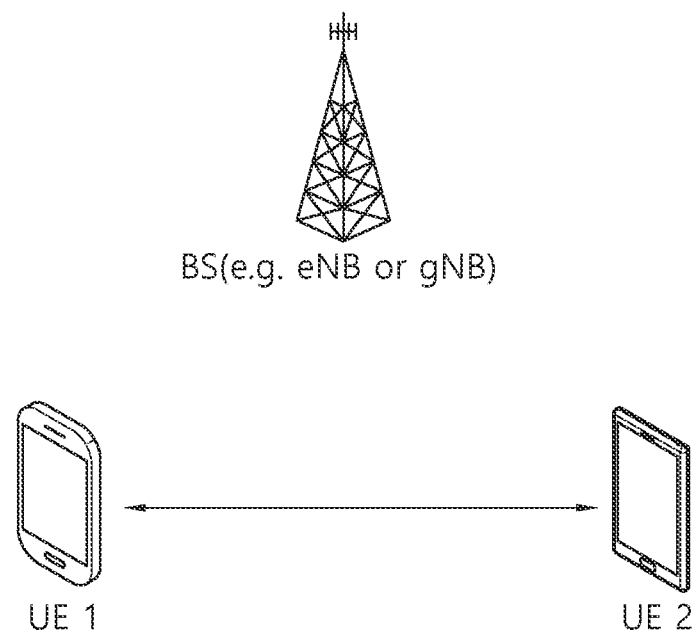
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
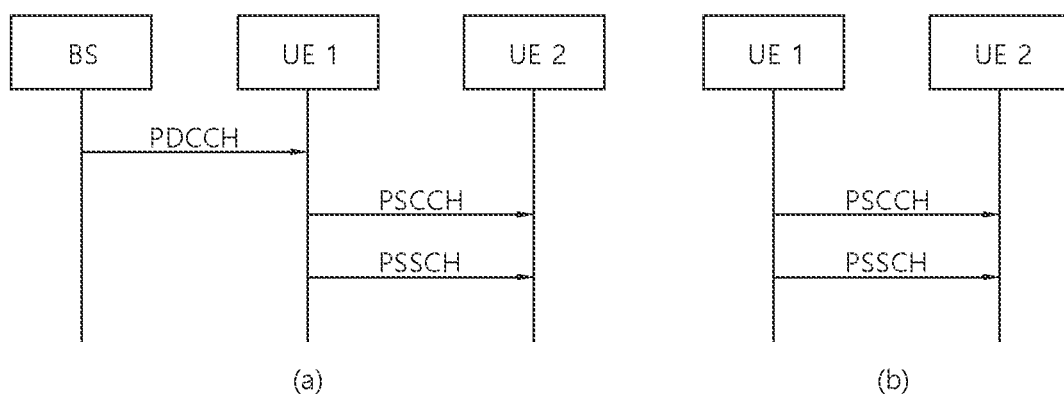
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
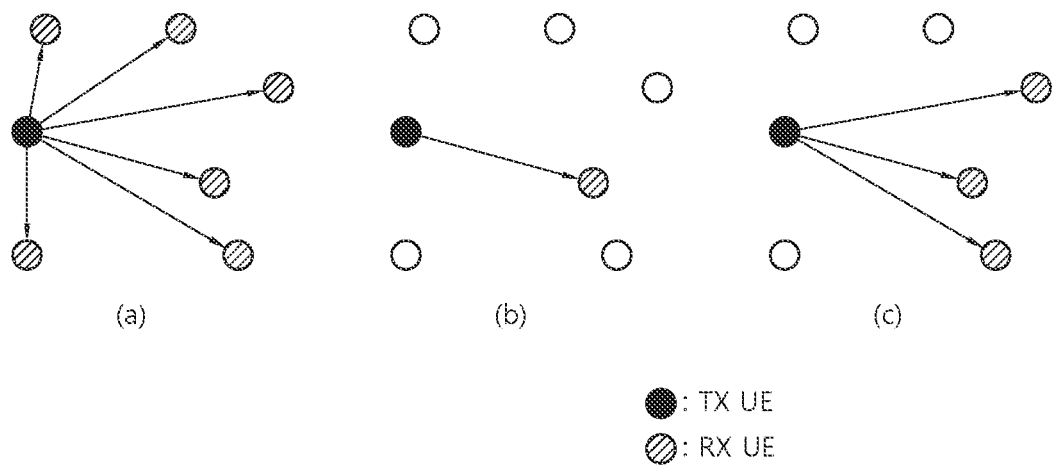
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, in a case of Uu link-based communication and sidelink (SL)-based communication in which a carrier is shared and used in a time duplex division (TDD) method, a user equipment (UE) may use at least an uplink (UL) slot as an SL slot. Alternatively, a network may arbitrarily configure an SL slot for a UE to minimize interference in Uu link-based ommunication. Here, communication based on a Uu link may be communication between a base station and a UE, and communication based on an SL link may be communication between UEs. For convenience of description, Uu link-based communication may be referred to as Uu communication, and SL link-based communication may be referred to as SL communication. For example, a network may be a base station or a V2X server.

At this time, when a network configures SL slot configuration information for a UE in advance, an in-coverage (INC) UE and an out-of-coverage (OOC) UE may perform SL communication based on the same SL slot configuration information. However, if a network reconfigures SL slot configuration information, the INC UE may receive reconfigured SL slot configuration information from the network, whereas the OOC UE outside the coverage of the network may not receive the reconfigured SL slot configuration information from the network. Therefore, the OCC UE cannot know the reconfigured SL slot configuration information.

To solve this problem, an INC UE may transmit SL slot configuration information to an OOC UE through a physical sidelink broadcast channel (PSBCH). Through this, the INC UE and the OCC UE may perform SL communication using the same SL slot configuration information. However, at this time, since the number of bits that an INC UE can transmit through a PSBCH affects the detection performance of the PSBCH, it may be preferable that the INC UE transmits information of a limited number of bits through the PSBCH. According to various embodiments of the present disclosure, a method for transmitting information related to SL slot configuration using a limited number of bits in a PSBCH and an apparatus supporting the same are proposed.

According to an embodiment of the present disclosure, first, a network may configure/determine a UL/downlink (DL) TDD configuration for Uu communication, the network may determine a resource to be allocated to an SL slot from within the resource allocated to a UL slot based on the UL/DL TDD configuration. Through this, the network may configure/determine SL slot configuration. Alternatively, on the assumption that a network controls Uu communication to minimize interference, the network may allocate any slot among the slots configured by UL/DL TDD configuration to SL communication.

A cell-specific TDD-UL-DL-configuration configured by a network may include information related to a period and information related to the number of slots. For example, TDD-UL-DL-configuration may be applied in a form in which the same number of slots are periodically repeated. In this case, a plurality of periods may be configured for a UE, and an independent number of slots may be applied to each period. A plurality of slots within one period may consist of a DL slot —a flexible (F) slot —a UL slot, and this configuration may be referred to as a pattern. In this case, the F slot may be allocated as a DL slot or a UL slot by a separate configuration.

Table 5 shows an example of a TDD UL-DL-configuration (TDD-UL-DL-ConfigCommon).

TABLE 5

| The IE TDD-UL-DL-ConfigCommon determines the cell specific Uplink/Downlink TDD configuration. TDD-UL-DL-Configeommon information element |
|---|
| -- ASN1START<br>- TAG-TDD-UL-DL-CONFIGCOMMON-START<br>TDD-UL-DL-ConfigCommon ::=   SEQUENCE {<br> referenceSubcarrierSpacing   SubcarrierSpacing,<br> pattern1   TDD-UL-DL-Pattern,<br> pattern2   TDD-UL-DL-Pattern<br>OPTIONAL, -- Need R<br>...<br>}<br>TDD-UL-DL-Pattern ::=   SEQUENCE {<br> dl-UL-TransmissionPeriodicity   ENUMERATED {ms0p5, ms0p625, ms1,<br>ms1p25, ms2, ms2p5, ms5, ms10},<br> nrofDownlinkSlots   INTEGER (0..maxNrofSlots),<br> nrofDownlinkSymbols   INTEGER (0..maxNrofSymbols-1),<br> nrofUplinkSlots   INTEGER (0..maxNrofSlots),<br> nrofUplinkSymbols   INTEGER (0..maxNrofSymbols-1),<br>...,<br>[[<br> dl-UL-TransmissionPeriodicity-v1530   ENUMERATED {ms3, ms4}<br>OPTIONAL -- Need R<br>]]<br>}<br>-- TAG-TDD-UL-DL-CONFIG-COMMON-STOP<br>-- ASN1STOP |
| TDD-L7L-DL-ConfigCommon field descriptions |
| referenceSubcarrierSpacing |
| Reference SCS used to determine the time domain boundaries in the UL-DL pattern which must be common across all subcarrier specific carriers, i.e., independent of the actual subcarrier spacing using for data transmission. Only the values 15, 30 or 60 kHz (FR1), and 60 or 120 kHz (FR2) are applicable. The network<br>configures a not larger than any SCS of configured BWPs for the serving cell. See TS 38.213 [13], clause 11.1. |
| TDD-UL-DL-Pattern field descriptions |
| dl-UL-TransmissionPeriodicity |
| Periodicity of the DL-UL pattern, see TS 38.213 [13], clause 11.1. If the dl-UL-TransmissionPeriodicity-v1530 is signalled, UE shall ignore the dl-UL-TransinissionPeriodicity (without suffix). |

TABLE 5-continued

The IE TDD-UL-DL-ConfigCommon determines the cell specific Uplink/Downlink TDD configuration.
TDD-UL-DL-Configeommon information element nrofDownlinkSlots Number of consecutive full DL slots at the beginning of each DL UL pattern see TS 38.213 [13], clause 11.1. In this release, the maximum value for this field is 80.

nrofDownlinkSymbols

Number of consecutive DL symbols in the beginning of the slot following the last full DL slot (as derived from nrofDownlinkSlots). The value 0 indicates that there is no partial-downlink slot. (see TS 38.213 [13], clause 11.1).

nrofUplinkSlots

Number of consecutive full UL slots at the end of each DL-UL pattern, see TS 38.213 [13], clause 11.1. In this release, the maximum value for this field is 80.

nrofUplinkSymbols

Number of consecutive UL symbols in the end of the slot preceding the first full UL slot (as derived from nrofUplinkSlots). The value 0 indicates that there is no partial-uplink slot. (see TS 38.213 [13], clause 11.1).

Referring to Table 5, the information (TDD-UL-DL-Pattern) related to each pattern may include information related to the number of DL slots, the number of DL symbols, the number of UL slots, and/or the number of UL symbols. For example, a base station allocates as many DL resources as the number of DL slots configured through RRC signaling from the start time of each pattern, and next, the base station may allocate as many DL resources as the number of DL symbols configured through RRC signaling from the first symbol to the next slot of the last DL slot in the pattern.

Figure 12:
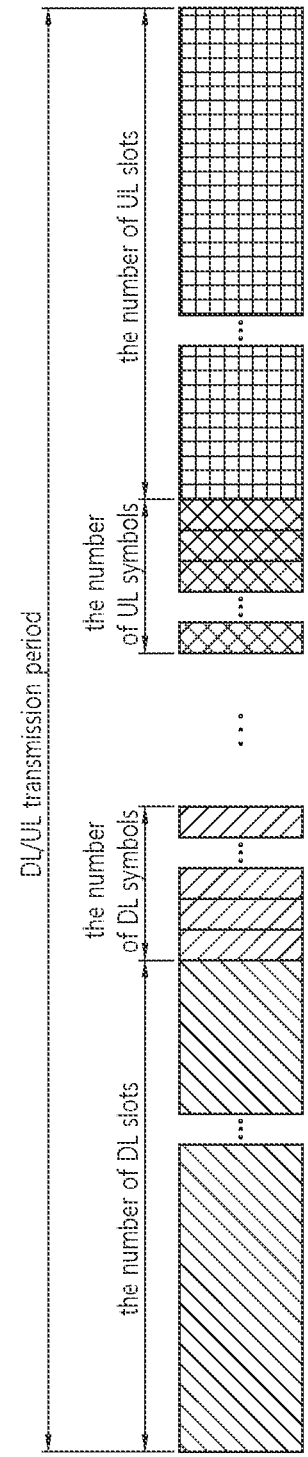
FIG. 12 shows a DL slot, a DL symbol, a UL slot, and a UL symbol allocated within a DL/UL period according to an embodiment of the present disclosure.

FIG. 12 shows a DL slot, a DL symbol, a UL slot, and a UL symbol allocated within a DL/UL period according to an embodiment of the present disclosure. The embodiment of FIG. 12 may be combined with various embodiments of the present disclosure.

Referring to FIG. 12, for example, a base station allocates UL resources as many as the number of UL slots configured through RRC signaling from the end point of each pattern, next, the base station may allocate as many UL resources as the number of UL symbols configured through RRC signaling from the last symbol of the previous slot of the first UL slot in the pattern. The above single or a plurality of patterns may be repeatedly applied in units of (sum) period. For example, a UE receiving a TDD-UL-DL configuration from a base station may know that DL resources and/or UL resources are allocated as shown in FIG. 12.

According to an embodiment of the present disclosure, when the SL slot is configured within the UL slot in the TDD-UL-DL-configuration, the SL slot may be configured as consecutive slots from the end of the cycle within one cycle. For example, if a network can configure a total of 8 periods within a maximum of 10 ms, and a maximum of 80 slots can exist within one period according to the SCS between 15 kHz and 120 kHz, the number of slots allocated to SL slot may also be up to 80 depending on configuration of UL slot. Accordingly, an SL TDD configuration transmitted by a UE through PSBCH may be configured with a total of 10 bits with a period of 3 bits and a pattern of 7 bits. At this time, a UE may expect that a network always applies only one TDD-UL-DL-configuration pattern to a Uu link carrier shared with SL. For example, at this time, a UE may determine that a network always applies only one TDD-UL-DL-configuration pattern for a Uu link carrier shared with SL.

According to an embodiment of the present disclosure, a network may configure two TDD-UL-DL-configuration patterns for a UE. In this case, for the patterns, the total number of periods that can be combined according to an SCS may be 18, and 5 bits may be required to represent 18 types of periods. In addition, in order to signal the number of SL slots for each pattern, 7 bits (total, 14 bits) may be required. Therefore, a total of 19 bits may be required for an SL TDD configuration transmitted through PSBCH. However, in this case, the PSBCH signaling overhead becomes too large. To solve this, when a network configures two TDD-UL-DL-configuration patterns for a UE, the network may allocate all slots of the second pattern as SL slots, and the first pattern as UL/DL slots. Accordingly, a UE may signal only the number of SL slots for the first pattern through PSBCH, allocate the entire slots of the second pattern as SL slots. In this case, 5 bits to indicate the period of the first pattern and 7 bits to indicate the number of SL slots, a total of 12 bits may be required to signal an SL TDD configuration. In this case, an INC UE may transmit a PSBCH including a 12-bit SL TDD configuration to an OCC UE.

According to an embodiment of the present disclosure, a network may configure two TDD-UL-DL-configuration patterns for a UE. In this case, the two patterns may be regarded as one integrated period, and a SL slot may be composed of consecutive slots from the end of the integrated period. In this case, since the two patterns are integrated, the bits for indicating the number of SL slots (e.g., a maximum of 160) may be increased by 1 bit from 7 bits to 8 bits. Accordingly, 5 bits for indicating the period and 8 bits for indicating the number of SL slots, a total of 13 bits, may be required to signal an SL TDD configuration. In this case, an INC UE may transmit a PSBCH including a 13-bit SL TDD configuration to an OCC UE.

According to an embodiment of the present disclosure, a network may configure two TDD-UL-DL-configuration patterns for a UE. In this case, the two patterns may be regarded as one integrated period, and an SL slot may be composed of consecutive slots from the end of the integrated period. In this case, an SL slot may always be allocated in units of two consecutive slot pairs. Accordingly, the number of bits required for a UE to signal the number of slot pairs within the integrated period may be reduced to 7 bits. In this case, 5 bits for indicating the period and 7 bits for indicating the number of SL slots, a total of 12 bits, may be needed to signal an SL TDD configuration. In this case, an INC UE may transmit a PSBCH including a 12-bit SL TDD configuration to an OCC UE. Alternatively, a network may configure or pre-configure information on how many consecutive slots to indicate the number of SL slots to a UE through higher layer signaling. For example, higher layer signaling may be RRC signaling.

According to an embodiment of the present disclosure, a network may configure two TDD-UL-DL-configuration patterns for a UE. In this case, if a combination of all cases of the possible period and the number of slots is coded according to an SCS, each case may be signaled with a total of 14 bits. At this time, if P is the total integrated period, P1 is the period of a first pattern, and P2 is the period of a second pattern, all combinations of possible periods may be expressed as shown in Table 6.

TABLE 6

| P | 0.5 | 0.625 | 1 | 1.25 | 2 | 2.5 | 4 | 5 | 10 | 20 |
|---|---|---|---|---|---|---|---|---|---|---|
| P1 | 0.5 | 0.625 | 1 | 1.25 | 2 | 2.5 | | 5 | 10 | |
| P1 + P2 | | 0.5 + 0.5 | 0.625 + 0.625 | 1 + 1 | 1.25 + 1.25 | 2 + 2 | 2.5 + 2.5 | 5 + 5 | 10 + 10 | |
| P1 + P2 | | | | | | 2 + 0.5 | | | | |
| P1 + P2 | | | | | | 0.5 + 2 | | | | |

For each of the above possible periods, when SCS values are 15 kHz, 30 kHz, 60 kHz, and 120 kHz, the number of possible SL slots may be as shown in Tables 7 to 10.

TABLE 7

| P | 1 | 2 | 4 | 5 | 10 | 20 |
|---|---|---|---|---|---|---|
| P1 | 1 | 2 | | 5 | 10 | |
| P1 + P2 | | | 1 | 4 | 25 | 100 |
| P1 + P2 | | | | | | |
| P1 + P2 | | | | | | |

Table 7 shows the case where the SCS value is 15 kHz.

TABLE 8

| P | 0.5 | 1 | 2 | 2.5 | 4 | 5 | 10 | 20 |
|---|---|---|---|---|---|---|---|---|
| P1 | 1 | 2 | 4 | 5 | | 10 | 20 | |
| P1 + P2 | | | 1 | 4 | 16 | 25 | 100 | 400 |
| P1 + P2 | | | | 4 | | | | |
| P1 + P2 | | | | 4 | | | | |

Table 8 shows the case where the SCS value is 30 kHz.

TABLE 9

| P | 0.5 | 1 | 2 | 2.5 | 4 | 5 | 10 | 20 |
|---|---|---|---|---|---|---|---|---|
| P1 | 2 | 4 | 8 | 10 | | 20 | 40 | |
| P1 + P2 | | | 4 | 4 | 36 | 64 | 100 | 400 | 1600 |
| P1 + P2 | | | | 16 | | | | |
| P1 + P2 | | | | 16 | | | | |

Table 9 shows the case where the SCS value is 60 kHz.

TABLE 10

| P | 0.5 | 0.625 | 1 | 1.25 | 2 | 2.5 | 4 | 5 | 10 | 20 |
|---|---|---|---|---|---|---|---|---|---|---|
| P1 | 4 | 5 | 8 | 10 | 16 | 20 | | 40 | 80 | |
| P1 + P2 | | | 16 | 25 | 64 | 100 | 256 | 400 | 1600 | 6400 |
| P1 + P2 | | | | | | 64 | | | | |
| P1 + P2 | | | | | | 64 | | | | |

Table 10 shows the case where the SCS value is 120 kHz.

Since all the above possible SL slots are 12,240, a total of 14 bits may be required to signal an SL TDD configuration. In this case, an INC UE may transmit a PSBCH including an SL TDD configuration of 14 bits to an OCC UE.

According to an embodiment of the present disclosure, an SL slot may not be limited to only a UL slot in TDD-UL-DL-configuration configured by a network. Or, even if an SL slot is limited to a UL slot in TDD-UL-DL-configuration configured by a network, the SL slot does not always consist of consecutive slots from the end of one pattern, but the SL slot may consist of consecutive slots from any starting position. In this case, the starting position of the slot and the number of consecutive slots may be expressed through joint coding. And, since there may be a maximum of 80 slots per one pattern, the number of slots in one period may be signaled through a total of $\lceil \log_2(80 \cdot 81/2) \rceil = 12$ bits. Accordingly, 3 bits to indicate the period and 12 bits to indicate the number of SL slots, a total of 15 bits, may be required to signal an SL TDD configuration. In this case, an INC UE may transmit a PSBCH including a 15-bit SL TDD configuration to an OCC UE.

According to an embodiment of the present disclosure, a network may configure two TDD-UL-DL-configuration patterns for a UE. In this case, the number of slots in each pattern may be expressed in units of a plurality of consecutive slots for each SCS. For example, the number of slots in each pattern may be expressed as follows.

1) In case of SCS=15 kHz, the number of slots in the pattern is expressed in units of one slot.

2) In case of SCS=30 kHz, the number of slots in the pattern is expressed in units of two slots.

3) In case of SCS=60 kHz, The number of slots in the pattern is expressed in units of 4 slots.

4) In case of SCS=120 kHz, The number of slots in the pattern is expressed in units of 8 slots.

In this case, a network may configure or pre-configure information on whether to express and signal the number of slots of a pattern in units of how many consecutive slots for each SCS to a UE through higher layer signaling. Alternatively, a network may configure or pre-configure one slot unit for a specific SCS to a UE, a slot unit for remaining SCSs may be scaled in proportion to the size of the SCSs. For example, in the case of the above embodiment, a network may configure or pre-configure a UE to express the number of slots in units of one slot for SCS=15 kHz, configure or pre-configure a UE to express the number of slots in units of 2, 4, or 8 slots for the remaining SCSs. For example, as described above, expressing the number of slots in units of 2, 4, or 8 slots for the remaining SCSs except for SCS=15 kHz may be using scaling-up. In this case, for example, when the number of UL slots configured by a network is smaller than a slot unit, a UE may not use the corresponding UL slot as an SL slot. Alternatively, when the number of UL slots configured by a network is smaller than a slot unit, a UE may consider/determine that a slot unit is one slot, and use the corresponding UL slot as an SL slot.

In this disclosure, even if a network configures two TDD-UL-DL-configurations to a UE, a method for a UE to configure/transmit an SL TDD configuration within a TDD-UL-DL-configuration configured by a network and an apparatus supporting the same are proposed, by using a PSBCH SL TDD configuration of a limited number of bits, while minimizing the loss of SL configuration flexibility and SL slot indication resolution.

According to an embodiment of the present disclosure, an SL TDD configuration information transmitted through a PSBCH may be signaled with X+Y+Z bits. For example, a UE may transmit an SL TDD configuration information composed of X+Y+Z bits to neighboring UEs through a PSBCH. In this case, X represents the number of SL TDD setup patterns, Y represents a period in which an SL TDD configuration pattern is applied and repeated, Z represents the number of SL slots for the SL TDD configuration pattern configured by X and Y. In this case, when two SL TDD configuration patterns are configured by X, Z may independently represent the number of SL slots for each pattern.

According to an embodiment of the present disclosure, when one SL TDD configuration pattern is configured, the repetition period of the SL TDD pattern may be as shown in Table 11.

TABLE 11

| Period (ms) | 0.5 | 0.625 | 1 | 1.25 | 2 | 2.5 | 4 | 5 | 10 |
|---|---|---|---|---|---|---|---|---|---|

Table 11 shows a period of one SL TDD configuration pattern.

For example, when two SL TDD configuration patterns are configured, a period of an SL TDD pattern may be as shown in Table 12. In the embodiment of Table 12, P1 is the period of the first SL TDD configuration pattern, P2 is the period of the second SL TDD configuration pattern, Total_P represents the sum of P1 and P2. In addition, two SL TDD configuration patterns may be repeated in a Total P (=P1+P2) period.

TABLE 12

| P1 (ms) | 0.5 | 0.625 | 1 | 0.5 | 2 | 1.25 | 1 | 3 | 2 | 1 | 4 | 2 | 3 | 2.5 | 5 | 10 |
|---|---|---|---|---|---|---|---|---|---|---|---|---|---|---|---|---|
| P2 (ms) | 0.5 | 0.625 | 1 | 2 | 0.5 | 1.25 | 3 | 1 | 2 | 4 | 1 | 3 | 2 | 2.5 | 5 | 10 |
| Total_P | 1 | 1.25 | 2 | 2.5 | 2.5 | 2.5 | 4 | 4 | 4 | 5 | 5 | 5 | 5 | 5 | 10 | 20 |

Table 12 shows a period of two SL TDD configuration patterns.

Therefore, in order to express all of the nine periods shown in Table 11 and the 16 periods shown in Table 12, a total of 5 bits may be required, with X=1 bit and Y=4 bits.

According to an embodiment of the present disclosure, when X=0, a UE may express the number of SL slots for one SL TDD configuration pattern as a Z value. For example, a UE may express the number of consecutive SL slots as a Z value from the end of the period of an SL TDD configuration pattern. According to each SL TDD configuration pattern period, the number of possible SL slots (i.e., NumStates) may be defined as shown in Table 13 below.

TABLE 13

| Period (ms) | SCS | | | |
|---|---|---|---|---|
| | 120 kHz NumStates | 60 kHz NumStates | 30 kHz NumStates | 15 kHz NumStates |
| 0.5 | 4 | 2 | 1 | |
| 0.625 | 5 | | | |
| 1 | 8 | 4 | 2 | 1 |
| 1.25 | 10 | 5 | | |
| 2 | 16 | 8 | 4 | 2 |
| 2.5 | 20 | 10 | 5 | |
| 4 | 32 | 16 | 8 | 4 |
| 5 | 40 | 20 | 10 | 5 |
| 10 | 80 | 40 | 20 | 10 |

Table 13 shows the number of SL slots according to a period of an SL TDD configuration pattern. For example, when X=1, a UE may express the number of SL slots for two SL TDD configuration patterns as a Z value. For example, a UE may express the number of consecutive SL slots from the end of a period of each SL TDD configuration pattern as a Z value. According to each SL TDD configuration pattern period, the number of all cases (i.e., NumStates) for a combination of the number of possible SL slots may be defined as shown in Table 14 below.

TABLE 14

| | | | SCS | | | |
|---|---|---|---|---|---|---|
| P1 | P2 | Total_P | 120 kHz SCS NumStates | 60 kHz NumStates | 30 kHz NumStates | 15 kHz NumStates |
| 0.5 | 0.5 | 1 | 25 | 9 | 4 | |
| 0.625 | 0.625 | 1.25 | 36 | | | |
| 1 | 1 | 2 | 81 | 25 | 9 | 4 |
| 0.5 | 2 | 2.5 | 85 | 27 | 10 | |
| 2 | 0.5 | 2.5 | 85 | 27 | 10 | |
| 1.25 | 1.25 | 2.5 | 121 | 36 | | |
| 1 | 3 | 4 | 225 * | 65 | 21 | 8 |
| 3 | 1 | 4 | 225 * | 65 | 21 | 8 |
| 2 | 2 | 4 | 289 * | 81 | 25 | 9 |
| 1 | 4 | 5 | 297 * | 85 | 27 | 10 |
| 4 | 1 | 5 | 297 * | 85 | 27 | 10 |
| 2 | 3 | 5 | 425 * | 117 | 35 | 12 |
| 3 | 2 | 5 | 425 * | 117 | 35 | 12 |
| 2.5 | 2.5 | 5 | 441 * | 121 | 36 | |
| 5 | 5 | 10 | 1681 ** | 441 * | 121 | 36 |
| 10 | 10 | 20 | 6561 *** | 1681 ** | 441 * | 121 |

Table 14 shows the number of cases for combination of the number of SL slots according to a period of two SL TDD configuration patterns. For example, in order to be able to express all the number of SL slots according to each period of the SL TDD configuration pattern, the number of cases for the combination of the number of SL slots according to a period of an SL TDD configuration pattern of Table 14 may need to be expressed by 7 bits. In Table 14, the number of cases marked with * is 128 or more values, which cannot be expressed with 7 bits. Therefore, for example, so that a Z value can be expressed as 7 bits, the number of SL slots in the case where * is not marked in Table 14 is expressed as the Z value as it is, the number of SL slots in the case of * may be expressed as a Z value by grouping a plurality of SL slots into one unit.

For example, if the number of cases for combination of the number of units for each pattern in the case of expressing a plurality of slots as one unit is expressed by 7 bits, the number of cases for the combination of the number of units may be 0 to 127. For example, the number of cases for a combination marked with * cannot be expressed with 7 bits as described above, for example, when two slots are expressed as one unit, the number of cases for a combination of the number of units for each pattern may be expressed as 7 bits. For example, expressing two slots as one unit may represent the number of cases based on a value related to granularity (here, for example, 2). For example, the number of cases for combinations marked with  cannot be expressed in 7 bits, for example, when 4 slots are expressed as one unit, the number of cases for a combination of the number of units for each pattern may be expressed as 7 bits. For example, representing 4 slots as one may represent the number of cases based on a value related to granularity (here, for example, 4). For example, the number of cases for combinations marked with * cannot be expressed in 7 bits, for example, when 8 slots are expressed as one unit, the number of cases for a combination of the number of units for each pattern may be expressed as 7 bits. For example, representing eight slots as one may represent the number of cases based on a value related to granularity (here, for example, 8).

According to an embodiment of the present disclosure, as a method for expressing the number of all SL slots as a Z value of a limited number of bits, according to an SCS value and a period value of an SL TDD configuration pattern, the number of SL slots that can be adaptively expressed as one unit may be adjusted. That is, according to an SCS value and a period value of an SL TDD configuration pattern, for a range that can be expressed by the number of bits allocated to a Z value, a UE may count the number of possible SL slots according to an SCS used, for a case beyond the range that can be expressed by the number of bits allocated to a Z value, a UE may count the number of a plurality of SL slots as one virtual SL slot by adjusting a reference SCS. For example, the reference SCS may be an SCS related to a size of a virtual SL slot.

For example, when Z=7 bits, for a combination of the number of SL slots marked with * among the values corresponding to SCS=120 kHz in Table 14, a UE may configure a reference SCS for counting the number of SL slots to 60 kHz. In this case, a UE may actually count two SL slots as one virtual SCS=60 kHz SL slot. Applying the same rule, among the values in Table 14, for a combination of the number of SL slots marked with *, a UE may express a Z value by using an SCS corresponding to ½ of the actually used SCS as a reference SCS. That is, a UE may count two SL slots as one virtual SL slot. Here, for example, a value related to granularity may be 2. For example, for a combination of the number of SL slots indicated by , a UE may express a Z value by using an SCS corresponding to ¼ of the actually used SCS as a reference SCS. That is, a UE may count 4r SL slots as one virtual SL slot. Here, for example, a value related to granularity may be 4. For example, for a combination of the number of SL slots indicated by *, a UE may express a Z value by using an SCS corresponding to ⅛ of the actually used SCS as a reference SCS. That is, a UE may count 8 SL slots as one virtual SL slot. Here, for example, a value related to granularity may be 8.

TABLE 15

| $a_1, a_2, a_3, a_4$ | Slot configuration period of pattern1 P (msec) | Slot configuration period of pattern2 $P_2$ (msec) | Granularity w in slots with different SCS | | | |
|---|---|---|---|---|---|---|
| | | | 15 kHz | 30 kHz | 60 kHz | 120 kHz |
| 0, 0, 0, 0 | 0.5 | 0.5 | | | | 1 |
| 0, 0, 0, 1 | 0.025 | 0.625 | | | | |
| 0, 0, 1, 0 | 1 | 1 | | | | |
| 0, 0, 1, 1 | 0.5 | 2 | | | | |
| 0, 1, 0, 0 | 1.25 | 1.25 | | | | |
| 0, 1, 0, 1 | 2 | 0.5 | | | | |
| 0, 1, 1, 0 | 1 | 3 | | 1 | | 2 |
| 0, 1, 1, 1 | 2 | 2 | | | | |
| 1, 0, 0, 0 | 3 | 1 | | | | |
| 1, 0, 0, 1 | 1 | 4 | | | | |
| 1, 0, 1, 0 | 2 | 3 | | | | |
| 1, 0, 1, 1 | 2.5 | 2.5 | | | | |
| 1, 1, 0, 0 | 3 | 2 | | | | |
| 1, 1, 0, 1 | 4 | 1 | | | | |
| 1, 1, 1, 0 | 5 | 5 | | 1 | 2 | 4 |
| 1, 1, 1, 1 | 10 | 10 | 1 | 2 | 4 | 8 |

Table 15 shows values related to a period of each pattern and granularity according to an SCS. Referring to Table 15, the number of SL slots for each pattern may be expressed as a unit of a plurality of slots. For example, the number of SL slots for each pattern may be expressed in units of slots related to an SCS obtained by dividing an SCS value related to an SL slot by a value w related to granularity. For example, when the period of a first pattern is 5 ms and the period of a second pattern is 1 ms, the number of SL slots of the first pattern and the second pattern related to the SCS of 120 kHz may be expressed in units of slots related to the SCS of 60 kHz by dividing 120 kHz by w=2. For example, when the period of a first pattern is 10 ms and the period of a second pattern is 10 ms, the number of SL slots of the first pattern and the second pattern related to the SCS of 60 kHz may be expressed in units of slots related to the SCS of 15 kHz by dividing 60 kHz by w=4.

Alternatively, for example, the number of SL slots for each pattern may be expressed as a new unit in which the number of slots as much as a value w related to granularity is expressed as one. For example, when the period of a first pattern is 5 ms and the period of a second pattern is 1 ms, the number of SL slots of the first pattern and the second pattern related to the SCS of 120 kHz may be expressed as a new unit in which w=2 SL slots are expressed as one. For example, when the period of a first pattern is 10 ms and the period of a second pattern is 10 ms, the number of SL slots of the first pattern and the second pattern related to the SCS of 60 kHz may be expressed as a new unit in which w=4 SL slots are expressed as one.

According to an embodiment of the present disclosure, the number of SL slots for each pattern may be included in a PSBCH based on Equation 1.

$$u^{SL}_{slots} \left\lfloor \frac{\left\lfloor u_{slots,2} * 2^{\mu-\mu}ref + \left\lfloor \frac{u_{sym,2} * 2^{\mu-\mu}ref}{L} \right\rfloor + I_2 \right\rfloor}{w} \right\rfloor * \left\lceil \frac{P*2^\mu + 1}{w} \right\rceil + \left\lfloor \frac{\left\lfloor u_{slots,2} * 2^{\mu-\mu}ref + \left\lfloor \frac{u_{sym,2} * 2^{\mu-\mu}ref}{L} \right\rfloor + I_1 \right\rfloor}{w} \right\rfloor$$ [Equation 1]

Referring to Equation 1, uSLslots represents the number of SL slots for each pattern. uslots represents the number of SL slots for a first pattern, and uslots,2 represents the number of SL slots for a second pattern. That is, the number of SL slots for both patterns may be expressed as uSLslots. usym represents the number of SL symbols for the first pattern, and usym,2 represents the number of SL symbols for the second pattern. μ represents a value related to an SCS in which an SL slot is used. μref represents a value relative to a reference SCS. w represents a value related to granularity. I1 and I2 represent values related to whether the number of SL symbols for the first pattern and the number of SL symbols for the second pattern affect uslots or uslots,2, respectively, based on w. L represents the maximum number of symbols in a slot. P represents the period (ms) of the first pattern.

Figure 13:
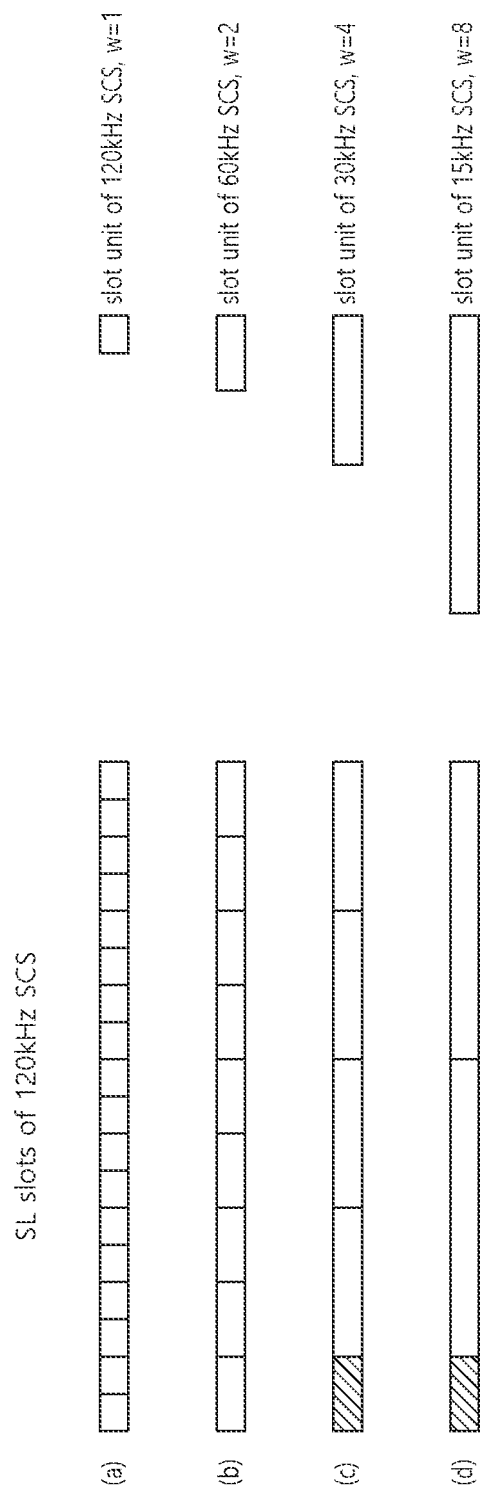
FIG. 13 shows an SL slot included in a period of one pattern according to an SL TDD configuration according to an embodiment of the present disclosure.

FIG. 13 shows an SL slot included in a period of one pattern according to an SL TDD configuration according to an embodiment of the present disclosure. The embodiment of FIG. 13 may be combined with various embodiments of the present disclosure.

Referring to FIG. 13, the number of SL slots to be transmitted through PSBCH may be the number of SL slots transmitted in SCS of 120 kHz. For example, the number of SL slots may be included in information related to the number of SL slots of each of the two patterns according to the SL TDD configuration and transmitted through PSBCH. For example, the information related to the number of SL slots in each of the two patterns may include a value related to the number of SL slots in each of the two patterns. For example, (a) to (d) of FIG. 13 may represent the period of a first pattern according to an SL TDD configuration. For example, in (a) of FIG. 13, the number of SL slots in the first pattern transmitted in the SCS of 120 kHz may be n. In this case, a value related to the number of SL slots of the first pattern may be n. For example, in (b) of FIG. 13 may represent a case in which the value (w) related to granularity is 2 based on the periods of two patterns according to an SL TDD configuration and an SCS (e.g., here, 120 kHz) related to SL communication. Here, the number of SL slots of the first pattern is n, but the SL slots of 120 kHz/w=60 kHz may be counted in a new unit. That is, the value related to the number of SL slots of the first pattern may be an integer part value of n/2. For example, (c) of FIG. 13 may represent a case in which the value related to granularity is 4 based on the periods of two patterns according to an SL TDD configuration and an SCS (e.g., here, 120 kHz) related to SL communication. Here, the number of SL slots of the first pattern is n, but the SL slots of 120 kHz/w=30 kHz may be counted as a new unit. That is, the value related to the number of SL slots of the first pattern may be an integer part value of n/4. For example, (d) of FIG. 13 may represent a case in which the value related to granularity is 8 based on the periods of two patterns according to an SL TDD configuration and an SCS (e.g., here, 120 kHz) related to SL communication. Here, the number of SL slots of the first pattern is n, but the SL slots of 120 kHz/w=15 kHz may be counted as a new unit. That is, the value related to the number of SL slots of the first pattern may be an integer part value of n/8.

Figure 14:
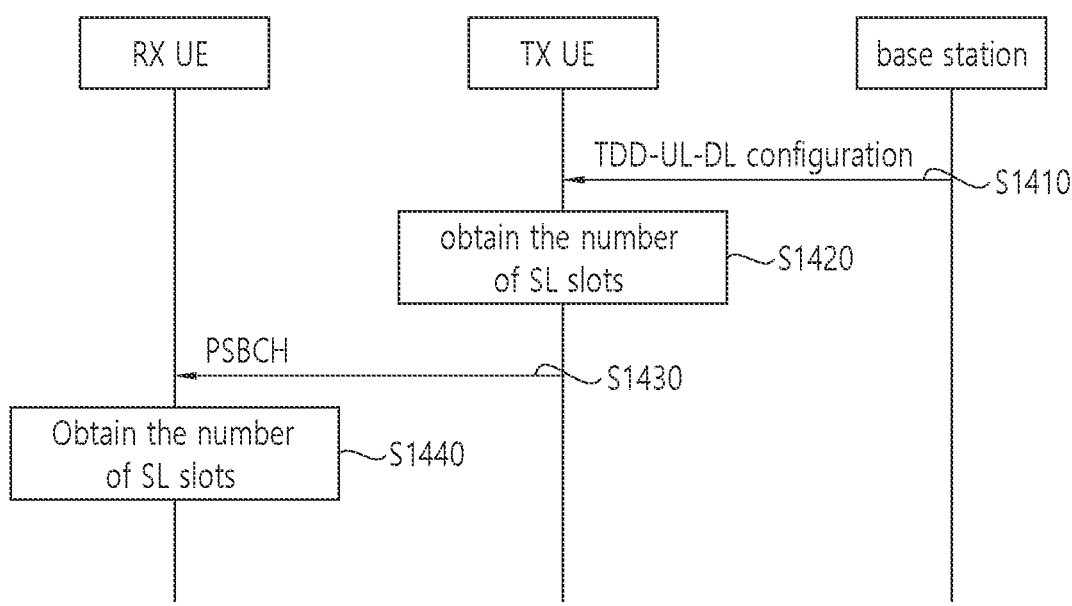
FIG. 14 shows a procedure for a TX UE to transmit a PSBCH to an RX UE according to an embodiment of the present disclosure.

FIG. 14 shows a procedure for a TX UE to transmit a PSBCH to an RX UE according to an embodiment of the present disclosure. The embodiment of FIG. 14 may be combined with various embodiments of the present disclosure.

Referring to FIG. 14, in step S1410, a base station may transmit TDD-UL-DL configuration information to a TX UE. For example, the TDD-UL-DL configuration information may include information related to a plurality of UL TDD patterns. The information related to the UL TDD patterns may include at least one of information related to a UL slot, information related to a UL symbol, and/or information related to a period of a UL TDD pattern. In step S1420, the TX UE may obtain the number of SL slots of each of the plurality of UL TDD patterns related to the SL communication based on information related to the plurality of UL TDD patterns and an SCS related to the SL communication. In step S1430, a TX UE may transmit a PSBCH to an RX UE. For example, a PSBCH may include information related to the number of SL slots of each of the plurality of UL TDD patterns. For example, the information related to the number of SL slots in each of the plurality of UL TDD patterns may include a value related to the number of SL slots in each of the plurality of UL TDD patterns. For example, a value related to the number of SL slots in each of the plurality of UL TDD patterns may include the number of slots counted in units of slots related to an SCS that is equal to or lower than an SCS related to SL communication. For example, an SCS equal to or lower than an SCS related to SL communication may be a number divided by a power of two from the SCS related to the SL communication. For example, the power of 2 may be a value related to granularity. For example, the value related to the granularity may be determined based on the period of each of the SCS related to SL communication and the plurality of UL TDD patterns. In step S1440, an RX UE may obtain the number of SL slots of each of the plurality of UL TDD patterns based on a value related to the number of SL slots, an SCS related to SL communication, and a period of the each of UL TDD patterns. For example, the RX UE may acquire the number of SL slots of each of the plurality of UL TDD patterns based on the value related to the granularity.

According to an embodiment of the present disclosure, as a method of expressing the number of all SL slots with a Z value of a limited number of bits, according to an SCS value, a period value of an SL TDD configuration pattern, and the actually configured number of SL slots, the number of SL slots that can be adaptively expressed as one unit may be adjusted. That is, according to an SCS value and a period value of an SL TDD configuration pattern, for a range that can be expressed by the number of bits allocated to a Z value, the UE can count the number of actual SL slots according to the SCS used, and when it exceeds the range that can be expressed by the number of bits allocated to a Z value, a UE may count the number of a plurality of SL slots as one virtual SL slot by adjusting a reference SCS.

For example, when Z=7 bits, for a combination of the number of SL slots indicated by * among the values corresponding to SCS=120 kHz in Table 14, when the number of SL slots is 0 to 127, a UE may count the number of SL slots as the number of actually configured SL slots. On the other hand, when the number of SL slots exceeds 127, a UE may configure a reference SCS for counting the number of SL slots to 60 kHz. In this case, a UE may actually count two SL slots as one virtual SCS=60 kHz SL slot. Applying the same rule, for a combination of the number of SL slots marked with * among the values in Table 14, if the number of SL slots is 0 to 127, a UE may count the number of SL slots as the number of actually configured SL slots, when the number of SL slots exceeds 127, a UE may express a Z value by using the SCS corresponding to ½ of the actually used SCS as a reference SCS. That is, a UE may count two SL slots as one virtual SL slot. For example, for a combination of the number of SL slots marked with , if the number of SL slots is 0 to 127, a UE may count the number of SL slots as the number of actually configured SL slots, when the number of SL slots exceeds 127, a UE may express a Z value by using the SCS corresponding to ¼ of the actually used SCS as a reference SCS. That is, a UE may count four SL slots as one virtual SL slot. For example, for a combination of the number of SL slots indicated by *, if the number of SL slots is 0 to 127, a UE may count the number of SL slots as the number of actually configured SL slots, when the number of SL slots exceeds 127, a UE may express a Z value by using the SCS corresponding to ⅛ of the actually used SCS as a reference SCS. That is, a UE may count 8 SL slots as one virtual SL slot.

According to an embodiment of the present disclosure, as described above, when a UE adjusts a reference SCS so that the number of virtual SL slots is within a range of values that can be expressed by Z bits, the UE may configure an independent reference SCS for each of the two SL TDD configuration patterns. For example, when SCS=120 kHz, and P1=1, P2=3, Total P=4, the number of all combinations of the number of SL slots may be 225. Therefore, when Z=7 bits, a range that can be expressed by the number of bits allocated to a Z value may be exceeded. In this case, if a UE configures all of reference SCSs for the two SL TDD configuration patterns to 60 kHz, the number of all combinations of the number of SL slots becomes 65, so that Z=7 bits can be expressed. However, even if a UE configures a reference SCS to 60 kHz only for the first pattern, and the UE uses the original 120 kHz as a reference SCS for the second pattern, the number of all combinations of the number of SL slots may be 125. That is, a UE can still express the number of all combinations of the number of SL slots with a Z value of 7 bits, and at the same time minimize the loss of clarity for the expression of the number of SL slots due to reference SCS adjustment.

According to an embodiment of the present disclosure, a UE may express a period (Period) of one SL TDD configuration pattern in Table 11 as a sum (Total P) of all periods of two SL TDD configuration patterns in Table 12. However, when the period is 0.5 and 0.625, the Total _P value cannot be expressed, so in this case, with respect to the two SL TDD configuration patterns, the same SL TDD pattern having the same period may be expressed in the form of being repeated twice. For example, when the period of one SL TDD configuration pattern is 0.5, a UE may express the period of two SL TDD configuration patterns (e.g., P1=0.5, P2=0.5, Total P=1). For example, when the period of one SL TDD configuration pattern is 0.625, a UE may express the period of two SL TDD configuration patterns (e.g., P1=0.625, P2=0.625, Total P=1.25). By expressing in this way, a UE can express the period shown in Tables 11 and 12 with a total of 4 bits (i.e., X=0 bits, Y=4 bits). Accordingly, signaling overhead for PSBCH transmission can be reduced. For example, according to the manner described above through Table 14, a UE may express both one SL TDD configuration pattern and two SL TDD configuration patterns.

According to an embodiment of the present disclosure, the number of X, Y, and Z bits may be predefined in a UE. For example, a base station or a network may configure or pre-configure the number of X, Y, and Z bits to a UE through higher layer signaling such as RRC signaling. For example, a base station or a network may signal the number of X, Y, and Z bits to a UE through a MAC control element (CE), DCI, or the like.

According to an embodiment of the present disclosure, whether to express one SL TDD configuration pattern with two SL TDD configuration patterns may be predefined in the UE. For example, a base station or a network may configure or pre-configure whether or not to express one SL TDD configuration pattern as two SL TDD configuration patterns to a UE through higher layer signaling such as RRC signaling. For example, a base station or a network may configure or pre-configure whether or not to express one SL TDD configuration pattern as two SL TDD configuration patterns to a UE through MAC CE, DCI, or the like.

According to an embodiment of the present disclosure, for two SL TDD configuration patterns, a combination out of an expression range of Z bits may be predefined in a UE. For example, a base station or a network may configure or pre-configure a combination out of an expression range of Z bits for two SL TDD configuration patterns to a UE through higher layer signaling such as RRC signaling. For example, a base station or a network may configure or pre-configure a combination out of an expression range of Z bits for two SL TDD configuration patterns to a UE through MAC CE, DCI, or the like.

According to an embodiment of the present disclosure, for the two SL TDD configuration patterns, the number of SL TDD configuration patterns to be applied differently from an SCS actually used, a period of the SL TDD configuration pattern, the number of SL slots, and a reference SCS to be applied in that case (hereinafter, first information) may be predefined in a UE. For example, a base station or a network may configure or pre-configure first information to a UE through higher layer signaling such as RRC signaling. For example, a base station or a network may configure or pre-configure first information to a UE through MAC CE, DCI, or the like. At this time, a reference SCS to be applied to the two TDD SL configuration patterns may be equally applied to the two TDD SL configuration patterns, or a reference SCS for each of the two TDD SL configuration patterns may be independently predefined, or 'a base station or a network' may (pre)configure to a UE through higher layer signaling such as RRC signaling, or 'a base station or a network' may signal to a UE through MAC CE, DCI, or the like.

According to various embodiments of the present disclosure, an efficient method of configuring an SL slot for a TDD-UL-DL-configuration configured by a network through a PSBCH having a limited number of bits has been proposed. According to the proposed embodiment, when a network configures two TDD-UL-DL-configurations for a UE, the UE may signal an SL-related resource using the least bit through a PSBCH, sharpness representing the number of slots to be used for SL may be increased as much as possible. In addition, by expressing one SL TDD configuration pattern with two SL TDD configuration patterns, signaling overhead may be reduced. In addition, according to an SCS value, a period value of an SL TDD configuration pattern, and/or the number of actually configured SL slots, a UE may adaptively adjust a reference SCS value as a reference for counting the number of SL slots. Accordingly, a UE counts a plurality of SL slots as one virtual SL slot, so that the signaling overhead representing a SL TDD configuration pattern period may be reduced.

Figure 15:
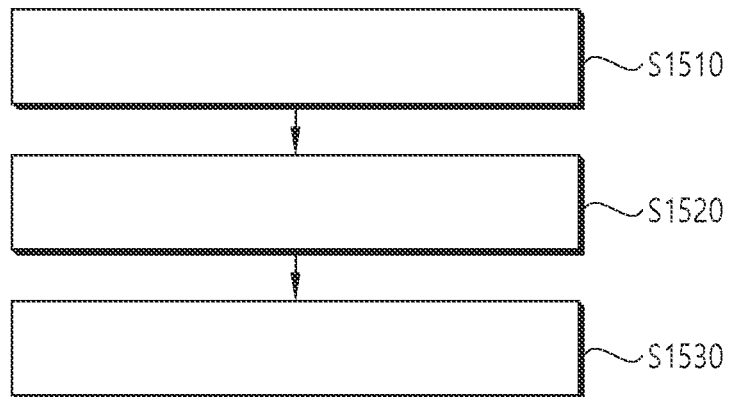
FIG. 15 shows a procedure in which a first apparatus transmits a PSBCH according to an embodiment of the present disclosure.

FIG. 15 shows a procedure in which a first apparatus transmits a PSBCH according to an embodiment of the present disclosure. The embodiment of FIG. 15 may be combined with various embodiments of the present disclosure.

Referring to FIG. 15, in step S1510, a first apparatus may receive time division duplex-uplink-downlink (TDD-UL-DL) configuration information including information related to a first slot pattern and information related to a second slot pattern from a base station. For example, information related to the first slot pattern may include information related to a period of the first slot pattern and information related to a first UL resource, and the information related to the second slot pattern may include information related to a period of the second slot pattern and information related to a second UL resource. In step S1520, the first apparatus may obtain the number of first sidelink (SL) slots related to the first slot pattern and the number of second SL slots related to the second slot pattern, based on a first subcarrier spacing (SCS) related to SL communication and the TDD-UL-DL configuration information. In step S1530, the first apparatus may transmit a physical sidelink broadcast channel (PSBCH) including information related to the number of the first SL slots and information related to the number of the second SL slots to a second apparatus. For example, the number of the first SL slots and the number of the second SL slots may be expressed based on a unit counting a plurality of slots as one, based on i) the information related to the period of the first slot pattern, ii) the information related to the period of the second slot pattern, and iii) the first SCS, and the SL communication may be performed based on the number of the first SL slots and the number of the second SL slots.

For example, the unit counting the plurality of slots as one may be a unit counting slots related to a second SCS lower than the first SCS as one.

For example, the second SCS may be an SCS divided by a number of powers of 2 from the first SCS.

For example, the number of powers of 2 may be a value related to granularity of a slot.

For example, based on that the sum of the period of the first slot pattern and the period of the second slot pattern is 4 ms and the first SCS is 120 kHz, the number of powers of 2 may be 2.

For example, based on that the sum of the period of the first slot pattern and the period of the second slot pattern is 5 ms and the first SCS is 120 kHz, the number of powers of 2 may be 2.

For example, based on that the period of the first slot pattern is 5 ms, the period of the second slot pattern is 5 ms, and the first SCS is 60 kHz, the number of powers of 2 may be 2.

For example, based on that the period of the first slot pattern is 10 ms, the period of the second slot pattern is 10 ms, and the first SCS is 30 kHz, the number of powers of 2 may be 2.

For example, based on that the period of the first slot pattern is 5 ms, the period of the second slot pattern is 5 ms, and the first SCS is 120 kHz, the number of powers of 2 may be 4.

For example, based on that the period of the first slot pattern is 10 ms, the period of the second slot pattern is 10 ms, and the first SCS is 60 kHz, the number of powers of 2 may be 4.

For example, based on that the period of the first slot pattern is 10 ms, the period of the second slot pattern is 10 ms, and the first SCS is 120 kHz, the number of powers of 2 may be 8.

For example, the first UL resource may include at least one of a first UL slot or a first UL symbol, and the second UL resource may include at least one of a second UL slot or a second UL symbol.

For example, the first UL resource may be used as the first SL slot, and the second UL resource may be used as the second SL slot.

The above-described embodiment may be applied to various apparatuses to be described below. For example, a processor 102 of a first apparatus 100 may control a transceiver 106 to receive time division duplex-uplink-downlink (TDD-UL-DL) configuration information including information related to a first slot pattern and information related to a second slot pattern from a base station 300. And, the processor 102 of the first apparatus 100 may obtain the number of first sidelink (SL) slots related to the first slot pattern and the number of second SL slots related to the second slot pattern, based on a first subcarrier spacing (SCS) related to SL communication and the TDD-UL-DL configuration information. And, the processor 102 of the first apparatus 100 may control the transceiver 106 to transmit a physical sidelink broadcast channel (PSBCH) including information related to the number of the first SL slots and information related to the number of the second SL slots to a second apparatus 200.

According to an embodiment of the present disclosure, a first apparatus for performing wireless communication may be proposed. For example, the first apparatus may comprise one or more memories storing instructions; one or more transceivers; and one or more processors connected to the one or more memories and the one or more transceivers. For example, the one or more processors may execute the instructions to: receive time division duplex-uplink-downlink (TDD-UL-DL) configuration information including information related to a first slot pattern and information related to a second slot pattern from a base station, wherein the information related to the first slot pattern may include information related to a period of the first slot pattern and information related to a first UL resource, and wherein the information related to the second slot pattern may include information related to a period of the second slot pattern and information related to a second UL resource; obtain the number of first sidelink (SL) slots related to the first slot pattern and the number of second SL slots related to the second slot pattern, based on a first subcarrier spacing (SCS) related to SL communication and the TDD-UL-DL configuration information; and transmit a physical sidelink broadcast channel (PSBCH) including information related to the number of the first SL slots and information related to the number of the second SL slots to a second apparatus, wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and wherein the SL communication may be performed based on the number of the first SL slots and the number of the second SL slots.

According to an embodiment of the present disclosure, an apparatus configured to control a first user equipment (UE) may be proposed. For example, the apparatus may comprise one or more processors; and one or more memories operably connectable to the one or more processors and storing instructions. For example, the one or more processors may execute the instructions to: receive time division duplex-uplink-downlink (TDD-UL-DL) configuration information including information related to a first slot pattern and information related to a second slot pattern from a base station, wherein the information related to the first slot pattern may include information related to a period of the first slot pattern and information related to a first UL resource, and wherein the information related to the second slot pattern may include information related to a period of the second slot pattern and information related to a second UL resource; obtain the number of first sidelink (SL) slots related to the first slot pattern and the number of second SL slots related to the second slot pattern, based on a first subcarrier spacing (SCS) related to SL communication and the TDD-UL-DL configuration information; and transmit a physical sidelink broadcast channel (PSBCH) including information related to the number of the first SL slots and information related to the number of the second SL slots to a second UE, wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and wherein the SL communication may be performed based on the number of the first SL slots and the number of the second SL slots.

According to an embodiment of the present disclosure, a non-transitory computer-readable storage medium storing instructions may be proposed. For example, the instructions, when executed, may cause a first apparatus to: receive time division duplex-uplink-downlink (TDD-UL-DL) configuration information including information related to a first slot pattern and information related to a second slot pattern from a base station, wherein the information related to the first slot pattern may include information related to a period of the first slot pattern and information related to a first UL resource, and wherein the information related to the second slot pattern may include information related to a period of the second slot pattern and information related to a second UL resource; obtain the number of first sidelink (SL) slots related to the first slot pattern and the number of second SL slots related to the second slot pattern, based on a first subcarrier spacing (SCS) related to SL communication and the TDD-UL-DL configuration information; and transmit a physical sidelink broadcast channel (PSBCH) including information related to the number of the first SL slots and information related to the number of the second SL slots to a second apparatus, wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and wherein the SL communication may be performed based on the number of the first SL slots and the number of the second SL slots.

Figure 16:
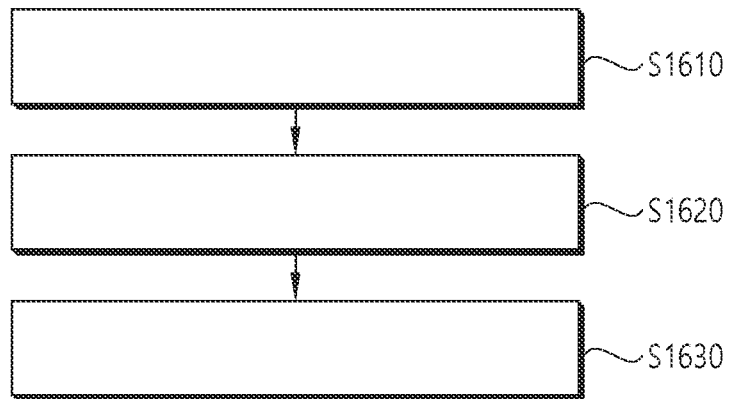
FIG. 16 shows a procedure in which a second apparatus performs SL communication, according to an embodiment of the present disclosure.

FIG. 16 shows a procedure in which a second apparatus performs SL communication, according to an embodiment of the present disclosure. The embodiment of FIG. 16 may be combined with various embodiments of the present disclosure.

Referring to FIG. 16, in step S1610, a second apparatus may receive a physical sidelink broadcast channel (PSBCH) including information related to a period of a first slot pattern, information related to a period of a second slot pattern, information related to the number of first sidelink (SL) slots related to the first slot pattern, and information related to the number of second SL slots related to the second slot pattern from a first apparatus. In step S1620, the second apparatus may obtain the number of the first SL slots and the number of the second SL slots from the information related to the number of the first SL slots and the information related to the number of the second SL slots, based on i) the information related to the period of the first slot pattern, ii) the information related to the period of the second slot pattern, and iii) a first subcarrier spacing (SCS) related to SL communication. In step S1630, the second apparatus may perform the SL communication based on the number of the first SL slots and the number of the second SL slots. For example, the information related to the number of the first SL slots and the information related to the number of the second SL slots may be expressed based on a unit counting a plurality of slots as one.

For example, the unit counting a plurality of slots as one may be a unit counting slots related to a second SCS lower than the first SCS as one, and the second SCS may be an SCS divided by a number of powers of 2 from the first SCS.

The above-described embodiment may be applied to various apparatuses to be described below. For example, a processor 202 of a second apparatus 200 may control a transceiver 206 to receive a physical sidelink broadcast channel (PSBCH) including information related to a period of a first slot pattern, information related to a period of a second slot pattern, information related to the number of first sidelink (SL) slots related to the first slot pattern, and information related to the number of second SL slots related to the second slot pattern from a first apparatus 100. And, the processor 202 of the second apparatus 200 may obtain the number of the first SL slots and the number of the second SL slots from the information related to the number of the first SL slots and the information related to the number of the second SL slots, based on i) the information related to the period of the first slot pattern, ii) the information related to the period of the second slot pattern, and iii) a first subcarrier spacing (SCS) related to SL communication. And, the processor 202 of the second apparatus 200 may perform the SL communication based on the number of the first SL slots and the number of the second SL slots.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive a physical sidelink broadcast channel (PSBCH) including information related to a period of a first slot pattern, information related to a period of a second slot pattern, information related to the number of first sidelink (SL) slots related to the first slot pattern, and information related to the number of second SL slots related to the second slot pattern from a first apparatus; obtain the number of the first SL slots and the number of the second SL slots from the information related to the number of the first SL slots and the information related to the number of the second SL slots, based on i) the information related to the period of the first slot pattern, ii) the information related to the period of the second slot pattern, and iii) a first subcarrier spacing (SCS) related to SL communication; and perform the SL communication based on the number of the first SL slots and the number of the second SL slots, wherein the information related to the number of the first SL slots and the information related to the number of the second SL slots are expressed based on a unit counting a plurality of slots as one.

For example, the unit counting a plurality of slots as one may be a unit counting slots related to a second SCS lower than the first SCS as one, and the second SCS may be an SCS divided by a number of powers of 2 from the first SCS.

In a situation where some of the NR networks start to spread while existing LTE networks are widely spread, to control an LTE UE by a technologically advanced NR network may be necessary. At this time, since the timing used by an NR network and the timing used by an LTE network are different, when LTE SL operation control and resource scheduling are performed through the NR Uu link, there may be ambiguity in determining the SL transmission resource by the UE, hence there may be a failure in communication between SL UEs.

In this disclosure, when the NR Uu connection controls LTE SL operation and schedules transmission resources, a method for smooth SL communication by removing the ambiguity and allowing all UEs to equally understand SL transmission resources is proposed.

For example, a UE may have both an NR module capable of performing NR Uu connection-based communication and an SL module capable of performing LTE SL-based communication. In this case, after the NR module of the UE receives NR SL DCI transmitted by an NR base station through a DL PDCCH, after the NR module decodes the NR SL DCI and restores the transmitted content, when the NR module converts the restored content into LTE SL DCI and transmits it to the LTE module, the LTE module may determine the LTE SL transmission resource. Herein, for example, NR Uu connection based communication may include communication between a UE (e.g., an NR module of a UE) and an NR base station (e.g., gNB). For example, LTE Uu connection based communication may include communication between a UE (e.g., an LTE module of a UE) and an LTE base station (e.g., an eNB).

For the above operation, information transmitted through NR SL DCI may include the time X ms required for an NR module of a UE to receive NR SL DCI, decode the NR SL DCI, and complete the conversion to LTE SL DCI, and the LTE SL DCI information transmitted by an existing LTE base station to an LTE SL UE. In this case, an existing LTE UE may use an SL resource on an LTE SL resource pool that exists at the earliest point after (4+M) ms from the time when the LTE SL DCI is received as the first SL transmission resource. Accordingly, LTE SL DCI information may include a timing offset value of the M ms value.

As a result, NR SL DCI may include two timing offset values: an X ms value required for processing by the NR module and an M ms value required for processing by the LTE module. At this time, an NR base station may expect a UE to use an SL resource on an LTE SL resource pool that exists at the earliest point after (X+4+M) ms after the time of receiving the NR SL DCI as the first LTE SL transmission resource.

At this time, since a method in which an NR module and an LTE module are actually implemented and the timing according to a clock used by each module may be different from each other, depending on NR and LTE module implementation, there may be ambiguity in which the timing for the LTE SL transmission resource may be interpreted differently between UEs differently than an NR base station intended.

In order to solve this problem, the following operation may be proposed. According to an embodiment of the present disclosure, after an NR module of a UE receives and decodes NR SL DCI from a base station, the NR module of the UE may convert the NR SL DCI to LTE SL DCI. And, at a time point exactly X ms after receiving the NR SL DCI, the NR module of the UE may deliver the converted LTE SL DCI to the LTE module. For example, in this case, the LTE module may perform the same operation as when LTE SL DCI is received through the existing LTE Uu link. That is, an LTE module may consider/determine the time when LTE SL DCI is received from an NR module as the time when LTE SL DCI is received through the LTE Uu connection, the UE may then operate in the same manner as an existing LTE modem. Therefore, even if a base station schedules LTE SL operation control and transmission resources through the NR Uu connection, it has an advantage that it can be used without modification cost for the existing legacy LTE module. At this time, for example, an LTE module may consider/determine the time of receiving LTE SL DCI from an NR module as TDL, use an SL resource on the LTE SL resource pool existing at the earliest point in time after $$T_{DL} - \frac{N_{TA}}{2} \times T_S + (4+m) \times 10^{-3} \text{ ms}$$

as the first LTE SL transmission resource. At this time, $$\frac{N_{TA}}{2} \times T_S = \frac{T_{TA}}{2}$$

value may be a value obtained by dividing a timing advance value by 2, and the value may be proportional to the distance between an NR base station and a UE.

According to an embodiment of the present disclosure, after an NR module of a UE receives and decodes NR SL DCI, the NR module of the UE may convert the NR SL DCI to LTE SL DCI. And, at a time point exactly X ms after receiving the NR SL DCI, the NR module of the UE may deliver the converted LTE SL DCI to the LTE module at the start time of the nearest LTE SL subframe. For example, even in this case, the LTE module may perform the same operation as when LTE SL DCI is received through the existing LTE Uu connection. That is, an LTE module may consider/determine the time when LTE SL DCI is received from an NR module as the time when LTE SL DCI is received through the LTE Uu connection, the UE may then operate in the same manner as an existing LTE modem. Therefore, even if the base station schedules LTE SL operation control and transmission resources through the NR Uu connection, it has the advantage of being able to use the existing legacy LTE module without modification cost. At this time, for example, an LTE module may consider/determine the time of receiving LTE SL DCI from an NR module as TDL, use an SL resource on an LTE SL resource pool that exists at the earliest point in time after $$T_{DL} - \frac{N_{TA}}{2} \times T_S + (4+m) \times 10^{-3} \text{ ms}$$

as the first LTE SL transmission resource. In this case, $$\frac{N_{TA}}{2} \times T_S = \frac{T_{TA}}{2}$$

value may be a value obtained by dividing a timing advance value by 2, and the value may be proportional to distance between an NR base station and a UE.

After an NR module of a UE receives and decodes NR SL DCI from a base station, the NR module of the UE may convert the NR SL DCI to LTE SL DCI. And, the NR module of the UE may directly deliver the converted LTE SL DCI to a LTE module. For example, in this case, so that the first LTE SL transmission resource can be determined according to the (X+4+M) ms timing offset value expected by an NR base station, the time when an NR module receives NR SL DCI together with LTE SL DCI and a timing offset value of the X ms value included in the NR SL DCI may be transmitted to an LTE module. The LTE module cannot perform the same operation as when receiving LTE SL DCI through the existing LTE Uu connection, the LTE module may need to determine an LTE SL transmission resource expected by an NR base station based on a timing offset information received from an NR module. At this time, for example, if the NR SL DCI reception time received by the LTE module is TDCI, and if the timing offset value required until an NR module indicated by the NR SL DCI field receives and decodes the NR SL DCI and then converts it to LTE SL DCI is X ms, The LTE module may use an SL resource on an LTE SL resource pool existing at the earliest point after $$T_{DCI} - \frac{N_{TA}}{2} \times T_S + X + (4+m) \times 10^{-3} \text{ ms}$$

as a first LTE SL transmission resource. At this time, $$\frac{N_{TA}}{2} \times T_S = \frac{T_{TA}}{2}$$

value may be a value obtained by dividing a timing advance value by 2, and the value may be proportional to distance between an NR base station and a UE. For example, in the above method, regardless of problems such as the implementation method of an NR module and an LTE module or a timing difference due to the use of different clocks, it has the advantage that an LTE SL transmission resource may be determined according to the timing intended by an NR base station.

For example, after a UE determines an initial LTE SL transmission resource, the UE may determine, using a period value configured through high-layer signaling, a periodic LTE SL transmission resource spaced apart from the initial LTE SL transmission resource at an interval as long as the period value on the basis of a logical subframe belonging to an LTE SL resource pool. For example, higher layer signaling may be RRC signaling.

In this case, for example, NR SL DCI format 3_1 for scheduling LTE SL transmission resources through NR Uu connection and NR SL DCI format 3_0 for scheduling NR SL transmission resources through NR Uu connection may need to have the same DCI size. The reason may be to limit blind detection complexity in which a UE needs to monitor NR SL DCI or NR Uu DCI to a certain range or less.

In this case, for example, in NR SL DCI format 3_0, there may be two types of DCI for dynamic grant and DCI for configured grant type-2. Accordingly, so that the size of NR SL DCI format 3_1 matches the maximum value among the size of NR SL DCI format 3_0 for the dynamic grant and the size of NR SL DCI format 3_0 for the configured grant type-2, a base station may determine or align the size of NR SL DCI format 3_1. Alternatively, for example, so that the size of NR SL DCI format 3_1 matches the smallest value among the size of NR SL DCI format 3_0 for the dynamic grant and the size of NR SL DCI format 3_0 for the configured grant type-2, a base station may determine or align the size of NR SL DCI format 3_1. For example, an operation in which a base station aligns the sizes of the NR SL DCI format may include an operation in which the base station performs zero padding on DCI having a small size.

Alternatively, for example, for the above operation, when the size of NR SL DCI format 3_0 for dynamic grant and the size of NR SL DCI format 3_0 for configured grant type-2 are different, a base station may align the sizes of NR SL DCI format 3_0 having a small size to NR SL DCI format 3_0 having a large size.

Alternatively, for example, when the size of NR SL DCI format 3_0 for dynamic grant and the size of NR SL DCI format 3_0 for configured grant type-2 are both smaller than the size of NR SL DCI format 3_1, a base station may align the size of the NR SL DCI format 3_0 for the dynamic grant and the size of the NR SL DCI format 3_0 for the configured grant type-2 to the size of the NR SL DCI format 3_1, through zero padding for the NR SL DCI format 3_0 for the dynamic grant and the NR SL DCI format 3_0 for the configured grant type-2, etc.

Alternatively, for example, when the size of NR SL DCI format 3_0 for dynamic grant and the size of NR SL DCI format 3_0 for configured grant type-2 are both smaller than the size of NR SL DCI format 3_1, a base station may truncate the NR SL DCI format 3_1. Through this, the base station can align the size of the NR SL DCI format 3_1 to the maximum value among the size of the NR SL DCI format 3_0 for the dynamic grant and the size of the NR SL DCI format 3_0 for the configured grant type-2.

Alternatively, a UE may expect or determine that an NR base station configures the size of at least one NR SL DCI format 3_0 among the size of NR SL DCI format 3_0 for dynamic grant and the size of the NR SL DCI format 3_0 for configured grand type-2 to be larger than the size of NR SL DCI format 3_1.

Alternatively, for example, based on the size of NR SL DCI format having a maximum value among the size of NR SL DCI format 3_0 for dynamic grant, the size of NR SL DCI format 3_0 for configured grant type-2, and the size of NR SL DCI format 3_1, a base station may align the sizes of the NR SL DCI formats through zero padding for the remaining NR SL DCI formats having smaller sizes.

In this case, for example, a base station may align the size of NR SL DCI format 3_0 for dynamic grant and the size of NR SL DCI format 3_0 for configured grant type-2 with the size of NR Uu DCI scheduling UL/DL transmission resource of UE through NR Uu link. For this, the size of NR SL DCI format 3_0 having a larger size among NR SL DCI format 3_0 for dynamic grant and NR SL DCI format 3_0 for configured grant type-2 may be size-aligned to an NR Uu DCI size allowing the number of padded zeros is the smallest among NR Uu DCI sizes.

According to an embodiment of the present disclosure, when a UE transmits an S-SSB for synchronization required for SL communication, the number of bits of a RESERVED field reserved for future scalability among information constituting a PSBCH may be determined by the number of input bits of a PSBCH bit interleaver or polar code. Or, for example, a base station or a network may configure or pre-configure the number of bits of a RESERVED field for a UE.

In the present disclosure, when an LTE SL transmission resource is scheduled through NR Uu connection, a method has been proposed so that all UEs can have the same understanding and determine LTE SL transmission resources without ambiguity about LTE SL transmission resources between UEs according to a timing offset configured by an NR base station. In addition, a method for efficiently performing size alignment between DCI scheduling LTE SL transmission resources through NR Uu and DCI scheduling LTE SL transmission resources through NR Uu is proposed. Hereinafter, an apparatus to which various embodiments of the present disclosure may be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
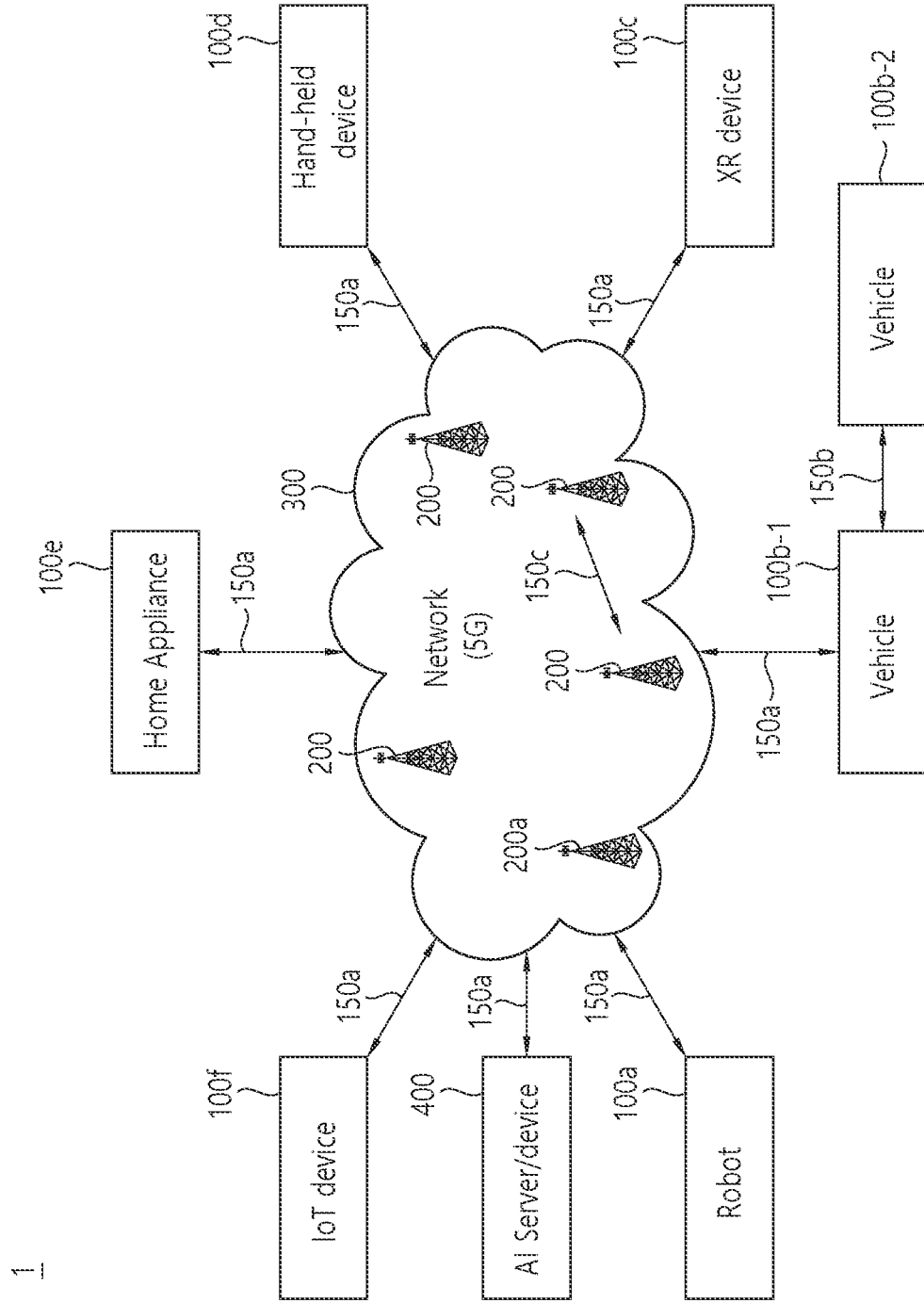
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
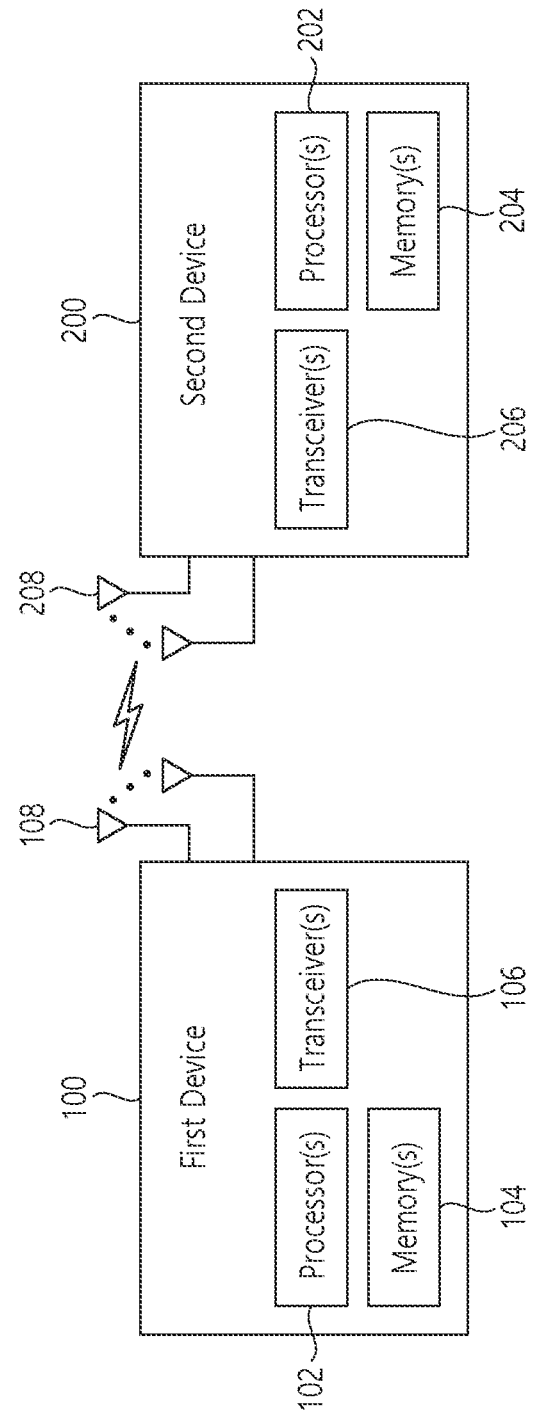
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
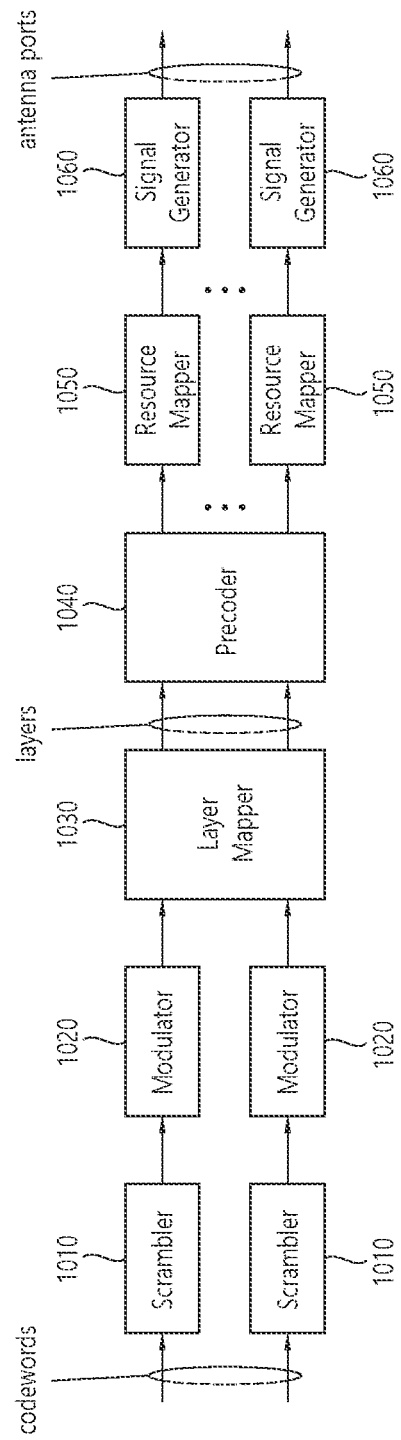
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
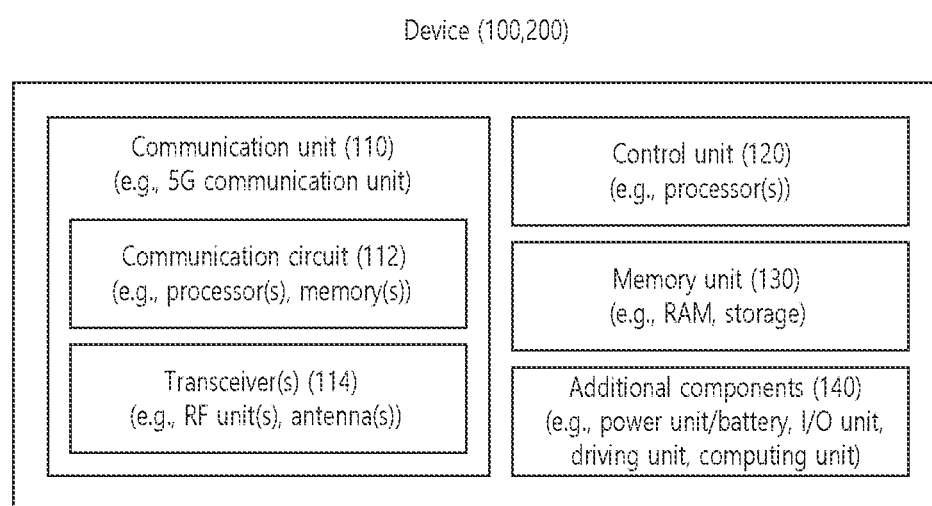
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
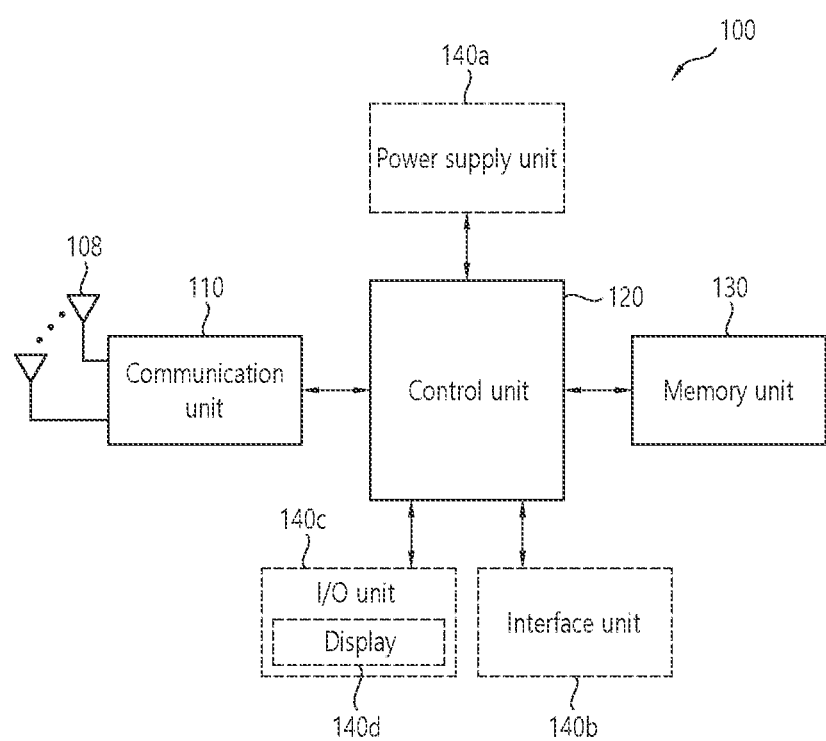
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
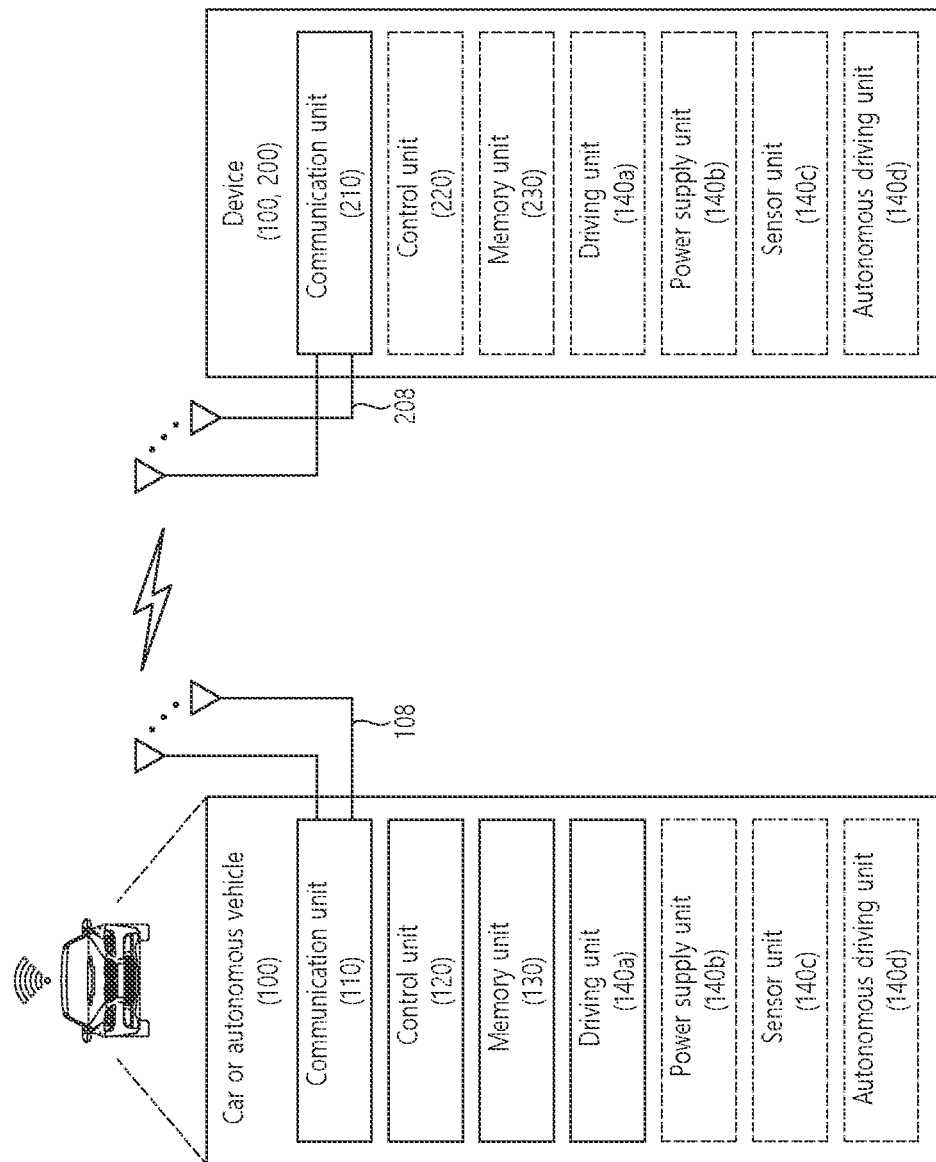
FIG. 22 shows a car or an autonomous vehicle, in accordance with an embodiment of the present disclosure.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a first apparatus to perform wireless communication, the method comprising:
receiving time division duplex-uplink-downlink (TDD-UL-DL) configuration information including information related to a first slot pattern and information related to a second slot pattern from a base station, wherein the information related to the first slot pattern includes information related to a period of the first slot pattern and information related to a first UL resource, and wherein the information related to the second slot pattern includes information related to a period of the second slot pattern and information related to a second UL resource;

obtaining the number of first sidelink (SL) slots related to the first slot pattern and the number of second SL slots related to the second slot pattern, based on a first subcarrier spacing (SCS) related to SL communication and the TDD-UL-DL configuration information; and transmitting a physical sidelink broadcast channel (PSBCH) including information related to the number of the first SL slots and information related to the number of the second SL slots to a second apparatus, wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and wherein the SL communication is performed based on the number of the first SL slots and the number of the second SL slots.

2. The method of claim 1, wherein the unit counting the plurality of slots as one is a unit counting slots related to a second SCS lower than the first SCS as one.

3. The method of claim 2, wherein the second SCS is an SCS divided by a number of powers of 2 from the first SCS.

4. The method of claim 3, wherein the number of powers of 2 is a value related to granularity of a slot.

5. The method of claim 3, wherein based on that the sum of the period of the first slot pattern and the period of the second slot pattern is 4 ms and the first SCS is 120 kHz, the number of powers of 2 is 2.

6. The method of claim 3, wherein based on that the sum of the period of the first slot pattern and the period of the second slot pattern is 5 ms and the first SCS is 120 kHz, the number of powers of 2 is 2.

7. The method of claim 3, wherein based on that the period of the first slot pattern is 5 ms, the period of the second slot pattern is 5 ms, and the first SCS is 60 kHz, the number of powers of 2 is 2.

8. The method of claim 3, wherein based on that the period of the first slot pattern is 10 ms, the period of the second slot pattern is 10 ms, and the first SCS is 30 kHz, the number of powers of 2 is 2.

9. The method of claim 3, wherein based on that the period of the first slot pattern is 5 ms, the period of the second slot pattern is 5 ms, and the first SCS is 120 kHz, the number of powers of 2 is 4.

10. The method of claim 3, wherein based on that the period of the first slot pattern is 10 ms, the period of the second slot pattern is 10 ms, and the first SCS is 60 kHz, the number of powers of 2 is 4.

11. The method of claim 3, wherein based on that the period of the first slot pattern is 10 ms, the period of the second slot pattern is 10 ms, and the first SCS is 120 kHz, the number of powers of 2 is 8.

12. The method of claim 1, wherein the first UL resource includes at least one of a first UL slot or a first UL symbol, and wherein the second UL resource includes at least one of a second UL slot or a second UL symbol.

13. The method of claim 1, wherein the first UL resource is used as the first SL slot, and wherein the second UL resource is used as the second SL slot.

14. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
receive time division duplex-uplink-downlink (TDD-UL-DL) configuration information including information related to a first slot pattern and information related to a second slot pattern from a base station,
wherein the information related to the first slot pattern includes information related to a period of the first slot pattern and information related to a first UL resource, and
wherein the information related to the second slot pattern includes information related to a period of the second slot pattern and information related to a second UL resource;
obtain the number of first sidelink (SL) slots related to the first slot pattern and the number of second SL slots related to the second slot pattern, based on a first subcarrier spacing (SCS) related to SL communication and the TDD-UL-DL configuration information; and
transmit a physical sidelink broadcast channel (PSBCH) including information related to the number of the first SL slots and information related to the number of the second SL slots to a second apparatus,
wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and
wherein the SL communication is performed based on the number of the first SL slots and the number of the second SL slots.

15. An apparatus configured to control a first user equipment (UE), the apparatus comprising:
one or more processors; and
one or more memories operably connectable to the one or more processors and storing instructions, wherein the one or more processors execute the instructions to:
receive time division duplex-uplink-downlink (TDD-UL-DL) configuration information including information related to a first slot pattern and information related to a second slot pattern from a base station,
wherein the information related to the first slot pattern includes information related to a period of the first slot pattern and information related to a first UL resource, and
wherein the information related to the second slot pattern includes information related to a period of the second slot pattern and information related to a second UL resource;
obtain the number of first sidelink (SL) slots related to the first slot pattern and the number of second SL slots related to the second slot pattern, based on a first subcarrier spacing (SCS) related to SL communication and the TDD-UL-DL configuration information; and
transmit a physical sidelink broadcast channel (PSBCH) including information related to the number of the first SL slots and information related to the number of the second SL slots to a second UE, wherein the number of the first SL slots and the number of the second SL slots are expressed based on a unit counting a plurality of slots as one, based on i) the information related to the period of the first slot pattern, ii) the information related to the period of the second slot pattern, and iii) the first SCS, and wherein the SL communication is performed based on the number of the first SL slots and the number of the second SL slots.

\* \* \* \* \*